United States Patent
Ishihara et al.

(10) Patent No.: US 11,678,051 B2
(45) Date of Patent: *Jun. 13, 2023

(54) IMAGE PICKUP DEVICE AND IMAGE PICKUP METHOD

(71) Applicant: Panasonic Holdings Corporation, Osaka (JP)

(72) Inventors: Takashi Ishihara, Kanagawa (JP); Kazutaka Yamamoto, Kanagawa (JP); Katsuyuki Ito, Kanagawa (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/665,217

(22) Filed: Feb. 4, 2022

(65) Prior Publication Data

US 2022/0159186 A1 May 19, 2022

Related U.S. Application Data

(63) Continuation of application No. 17/078,917, filed on Oct. 23, 2020, now Pat. No. 11,272,104, which is a
(Continued)

(30) Foreign Application Priority Data

Oct. 7, 2011 (JP) .................................. 2011-223175
Oct. 17, 2011 (JP) .................................. 2011-228032
(Continued)

(51) Int. Cl.
*H04N 23/667* (2023.01)
*G06F 3/0488* (2022.01)
(Continued)

(52) U.S. Cl.
CPC ......... *H04N 23/667* (2023.01); *G06F 3/0482* (2013.01); *G06F 3/0488* (2013.01);
(Continued)

(58) Field of Classification Search
CPC ........... H04N 1/00408; H04N 1/00411; H04N 1/23216; H04N 1/23293; H04N 5/23216;
(Continued)

(56) References Cited

U.S. PATENT DOCUMENTS 6,262,769 B1  7/2001  Anderson et al.
6,680,749 B1  1/2004  Anderson et al.
(Continued)

FOREIGN PATENT DOCUMENTS

JP  2000-039964  2/2000
JP  2002-281365  9/2002
(Continued)

OTHER PUBLICATIONS

International Search Report and Written Opinion (ISR/WO) in PCT/JP2012/006353, dated Jan. 15, 2013, together with English language translation of ISR.
(Continued)

*Primary Examiner* — Daniel M Pasiewicz
(74) *Attorney, Agent, or Firm* — Greenblum & Bernstein, P.L.C.

(57) ABSTRACT

A control method of an image pickup device is provided. The image pickup device includes a camera, a display, and a touch panel that is overlapped with the display and detects at least a sliding touch operation. The display displays a video image captured by the camera in first, second and third modes. The control method includes: switching to the second mode by a first sliding touch operation in a first direction on the touch panel in the first mode; switching to the third mode by a second sliding touch operation in the first
(Continued)

direction in the second mode; switching to the second mode by a third sliding touch operation in a second direction in the third mode; and switching to the first mode by a fourth sliding touch operation in the second direction in the second mode. The second direction is substantially opposite to the first direction.

20 Claims, 33 Drawing Sheets

Related U.S. Application Data continuation of application No. 16/692,546, filed on Nov. 22, 2019, now abandoned, which is a continuation of application No. 16/379,392, filed on Apr. 9, 2019, now Pat. No. 10,531,000, which is a continuation of application No. 15/672,594, filed on Aug. 9, 2017, now Pat. No. 10,306,144, which is a continuation of application No. 15/469,710, filed on Mar. 27, 2017, now Pat. No. 9,800,785, which is a continuation of application No. 15/340,234, filed on Nov. 1, 2016, now Pat. No. 9,648,228, which is a continuation of application No. 15/053,611, filed on Feb. 25, 2016, now abandoned, which is a continuation of application No. 14/642,903, filed on Mar. 10, 2015, now Pat. No. 9,443,476, which is a continuation of application No. 14/240,778, filed as application No. PCT/JP2012/006353 on Oct. 3, 2012, now Pat. No. 9,094,603.

(30) Foreign Application Priority Data

Dec. 14, 2011 (JP) ................................ 2011-273522
Jan. 31, 2012 (JP) ................................ 2012-018813

(51) Int. Cl.
| | |
|---|---|
| *H04N 23/63* | (2023.01) |
| *G06F 3/0489* | (2022.01) |
| *G06F 3/04883* | (2022.01) |
| *H04N 23/51* | (2023.01) |
| *H04N 23/62* | (2023.01) |
| *H04N 23/73* | (2023.01) |
| *H04N 23/65* | (2023.01) |
| *G09G 3/34* | (2006.01) |
| *G06F 3/04817* | (2022.01) |
| *G06F 3/0482* | (2013.01) |
| *G06F 3/04845* | (2022.01) |
| *G03B 17/02* | (2021.01) |
| *G03B 17/20* | (2021.01) |
| *H04M 1/72403* | (2021.01) |
| *G06F 3/04886* | (2022.01) |

(52) U.S. Cl.
CPC ...... *G06F 3/04817* (2013.01); *G06F 3/04845* (2013.01); *G06F 3/04883* (2013.01); *G06F 3/04897* (2013.01); *G09G 3/3406* (2013.01); *H04N 23/51* (2023.01); *H04N 23/62* (2023.01); *H04N 23/631* (2023.01); *H04N 23/633* (2023.01); *H04N 23/651* (2023.01); *H04N 23/73* (2023.01); *G03B 17/02* (2013.01); *G03B 17/20* (2013.01); *G06F 3/04886* (2013.01); *G09G 2320/0626* (2013.01); *H04M 1/72403* (2021.01); *H04M 2250/12* (2013.01); *H04M 2250/22* (2013.01); *H04M 2250/52* (2013.01)

(58) Field of Classification Search
CPC .... H04N 5/23293; H04N 23/62; H04N 23/63; G06F 3/0488; G06F 3/04886; G06F 3/04897; G09G 3/3406; G09G 2302/0626
See application file for complete search history.

(56) References Cited

U.S. PATENT DOCUMENTS

| | | | |
|---|---|---|---|
| 7,161,619 B1 | 1/2007 | Niida et al. | |
| 8,085,332 B2 | 12/2011 | Mori | |
| 8,189,087 B2 | 5/2012 | Misawa et al. | |
| 8,525,855 B1 | 9/2013 | Freyhult et al. | |
| 8,866,835 B2 | 10/2014 | Tanizoe et al. | |
| 9,055,209 B2 | 6/2015 | Shin | |
| 9,094,603 B2 | 7/2015 | Ishihara et al. | |
| 9,171,506 B2 | 10/2015 | Ishihara et al. | |
| 9,443,476 B2 | 9/2016 | Ishihara et al. | |
| 9,547,434 B2 | 1/2017 | Ishihara et al. | |
| 9,607,554 B2 | 3/2017 | Ishihara et al. | |
| 9,800,785 B2 | 10/2017 | Ishihara et al. | |
| 10,306,144 B2 | 5/2019 | Ishihara et al. | |
| 10,531,000 B2 | 1/2020 | Ishihara et al. | |
| 11,272,104 B2 * | 3/2022 | Ishihara | H04N 5/232939 |
| 2002/0008691 A1 | 1/2002 | Hanajima et al. | |
| 2003/0081135 A1 | 5/2003 | Boll | |
| 2003/0098847 A1 | 5/2003 | Yamamoto | |
| 2004/0008210 A1 | 1/2004 | Ikehata | |
| 2004/0263428 A1 | 12/2004 | Sudo | |
| 2005/0085280 A1 | 4/2005 | Takahashi | |
| 2007/0174534 A1 | 7/2007 | Wurzburg et al. | |
| 2008/0186285 A1 | 8/2008 | Shimizu | |
| 2008/0204402 A1 | 8/2008 | Hirata et al. | |
| 2009/0069056 A1 | 3/2009 | Lee et al. | |
| 2009/0158149 A1 | 6/2009 | Ko | |
| 2009/0228820 A1 | 9/2009 | Kim et al. | |
| 2009/0237547 A1 | 9/2009 | Misawa et al. | |
| 2009/0244357 A1 | 10/2009 | Huang | |
| 2010/0026643 A1 | 2/2010 | Ozawa et al. | |
| 2010/0110031 A1 | 5/2010 | Miyazawa et al. | |
| 2010/0110228 A1 | 5/2010 | Ozawa et al. | |
| 2010/0134433 A1 | 6/2010 | Miyanishi | |
| 2010/0146462 A1 | 6/2010 | Ishizawa | |
| 2010/0156830 A1 | 6/2010 | Homma et al. | |
| 2010/0166404 A1 | 7/2010 | Lombardi | |
| 2010/0173678 A1 | 7/2010 | Kim et al. | |
| 2010/0283754 A1 | 11/2010 | Nakao | |
| 2010/0284675 A1 | 11/2010 | Machida et al. | |
| 2011/0019058 A1 | 1/2011 | Sakai et al. | |
| 2011/0050915 A1 | 3/2011 | Wang et al. | |
| 2011/0080430 A1 | 4/2011 | Nishibe et al. | |
| 2011/0102357 A1 | 5/2011 | Kajitani | |
| 2011/0107208 A1 | 5/2011 | Michaelraj | |
| 2011/0109581 A1 | 5/2011 | Ozawa et al. | |
| 2011/0157047 A1 | 6/2011 | Nakagawa | |
| 2011/0221948 A1 | 9/2011 | Saito | |
| 2011/0263325 A1 | 10/2011 | Atkinson | |
| 2012/0011456 A1 | 1/2012 | Noda et al. | |
| 2012/0081573 A1 | 4/2012 | Park | |
| 2012/0083260 A1 | 4/2012 | Arriola et al. | |
| 2012/0113056 A1 | 5/2012 | Koizumi | |
| 2012/0113216 A1 | 5/2012 | Seen et al. | |
| 2012/0120277 A1 | 5/2012 | Tsai | |
| 2012/0280922 A1 | 11/2012 | Lee et al. | |
| 2013/0033434 A1 | 2/2013 | Richardson et al. | |
| 2013/0271401 A1 | 10/2013 | Sakai et al. | |
| 2014/0192244 A1 | 7/2014 | Ishihara et al. | |
| 2014/0327794 A1 | 11/2014 | Saito | |
| 2014/0340557 A1 | 11/2014 | Ishihara et al. | |
| 2015/0109218 A1 | 4/2015 | Satou | |
| 2015/0172534 A1 | 6/2015 | Miyakawa et al. | |
| 2015/0181110 A1 | 6/2015 | Ishihara et al. | |
| 2015/0195452 A1 | 7/2015 | Saito | |
| 2015/0229836 A1 | 8/2015 | Ishihara et al. | |

(56) References Cited

U.S. PATENT DOCUMENTS

| | | | |
|---|---|---|---|
| 2015/0304548 | A1 | 10/2015 | Ishihara et al. |
| 2017/0199881 | A1 | 7/2017 | Arriola et al. |

FOREIGN PATENT DOCUMENTS

| | | |
|---|---|---|
| JP | 2003-162277 | 6/2003 |
| JP | 2003-333417 | 11/2003 |
| JP | 2005-025268 | 1/2005 |
| JP | 2005-123908 | 5/2005 |
| JP | 2007-011612 | 1/2007 |
| JP | 2007-028512 | 2/2007 |
| JP | 2007-029341 | 2/2007 |
| JP | 2007-074070 | 3/2007 |
| JP | 2007-300353 | 11/2007 |
| JP | 2007-325288 | 12/2007 |
| JP | 2008-109221 | 5/2008 |
| JP | 2008-191799 | 8/2008 |
| JP | 2008-227925 | 9/2008 |
| JP | 2008-289053 | 11/2008 |
| JP | 2009-163346 | 7/2009 |
| JP | 2009-225280 | 10/2009 |
| JP | 2010-009335 | 1/2010 |
| JP | 2010-503082 | 1/2010 |
| JP | 2010-055598 | 3/2010 |
| JP | 2010-097393 | 4/2010 |
| JP | 2010-108273 | 5/2010 |
| JP | 2010-109788 | 5/2010 |
| JP | 2010-134859 | 6/2010 |
| JP | 2010-160581 | 7/2010 |
| JP | 2010-183244 | 8/2010 |
| JP | 2010-183477 | 8/2010 |
| JP | 2010-233958 | 10/2010 |
| JP | 2010-271774 | 12/2010 |
| JP | 2010-273166 | 12/2010 |
| JP | 2010-277183 | 12/2010 |
| JP | 2011-022811 | 2/2011 |
| JP | 2011-028345 | 2/2011 |
| JP | 2011-034196 | 2/2011 |
| JP | 2011-035813 | 2/2011 |
| JP | 2011-055096 | 3/2011 |
| JP | 2011-081440 | 4/2011 |
| JP | 2011-107823 | 6/2011 |
| JP | 2011-134260 | 7/2011 |
| JP | 2011-154455 | 8/2011 |
| JP | 2011-193249 | 9/2011 |
| WO | 2008/030779 | 3/2008 |
| WO | 2010/077604 | 7/2010 |

OTHER PUBLICATIONS

Office Action issued in Japan Patent Application No. 2015-160353, dated Jul. 19, 2016, together with an English language translation thereof.

"Capturing Still Images," AQUOS cellular phone 941SH User Manual, Japan, Softbank Mobile Corp. Nov. 30, 2009, pp. 8-5.-8-7, Internet<URL:http://edn.softbank.jp/mobile/set/data/support/product/941sh/download/pdf /941sh_userguide.pdf>, together with a corresponding English user guide.

Japan Office Action issued in corresponding Japan Patent Application No. 2015-160353, dated Feb. 7, 2017, together with a machine English language translation thereof.

Office Action issued in Japan Patent Appl. No. 2017-079109, dated Nov. 29, 2018 , along with an English translation thereof.

Kaori Koyama, "Books being read by iBooks", "Other electronic readers", iPad business practical use guide, Japan Mainichi Communications, Inc., Jul. 6, 2011, first edition, pp. 212-214.

Hiroaki Oguchi, "iPhonePeople Summer Autumn, "that reads digital book by" i library HD", Japan, ASCII Media Works, Inc., Jul. 29, 2010, first edition, pp. 076-077.

Youthkee, Lens+-30 [online], Sep. 27, 2011, URL: http://igfan.jp/2011/09/camcam/, together with a partial English language translation thereof.

Japan Office Action in Japan Patent Application No. 2018-35812, dated Dec. 25, 2018, together with a English language machine translation thereof.

Canon PowerShot SD900 IS Camera User Guide—2008.

Japan Office Action, dated Feb. 4, 2020, in Japan Patent Application No. 2019-078732, together with an English language translation thereof.

Office Action issued in Japan Patent Application No. 2020-158589, dated Oct. 26, 2021, together with English translation thereof.

* cited by examiner

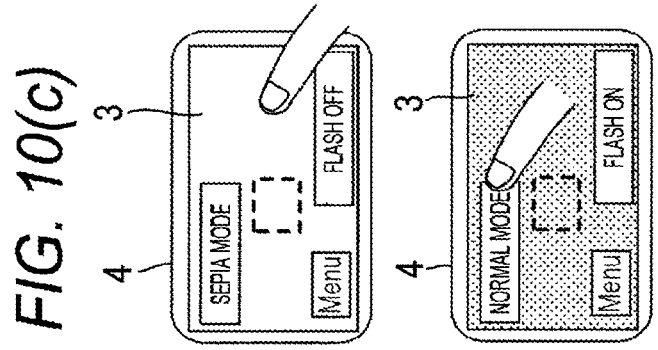
FIG. 10(c) FIG. 10(e)
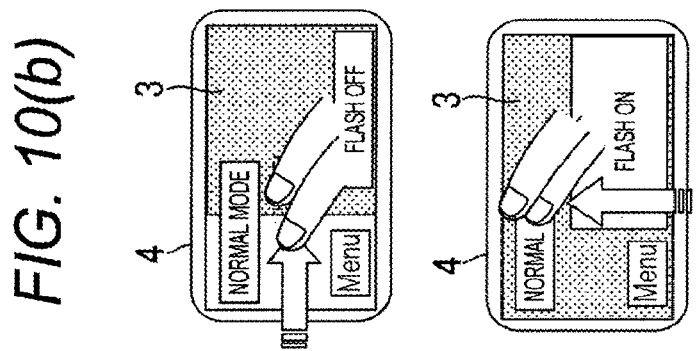
FIG. 10(b) FIG. 10(d)
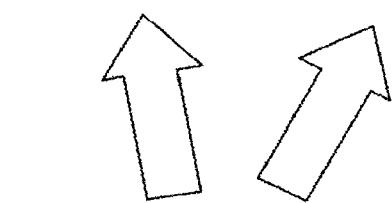
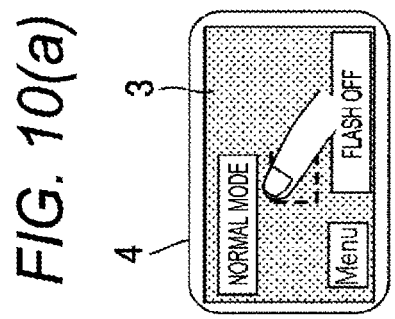
FIG. 10(a)

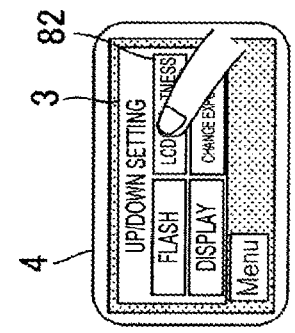
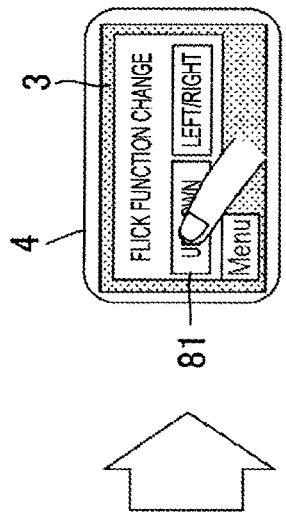
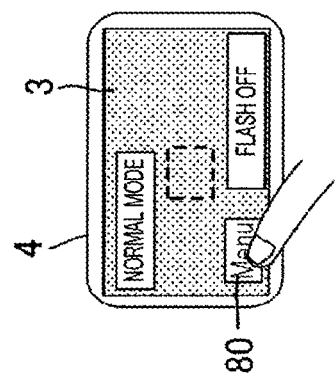
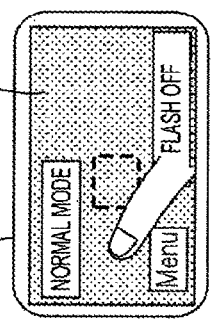
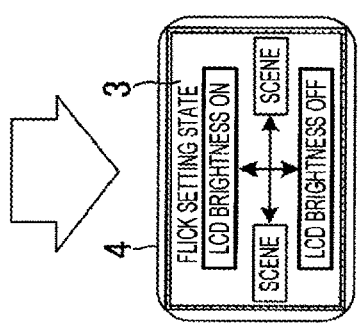

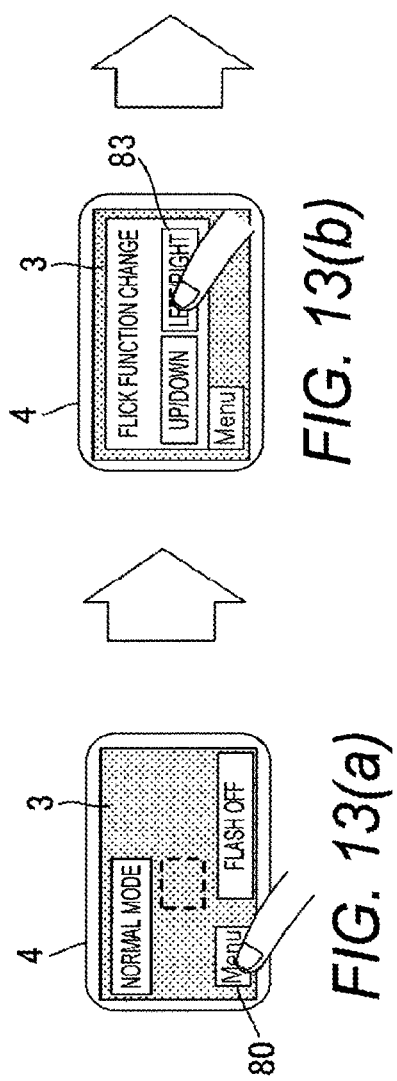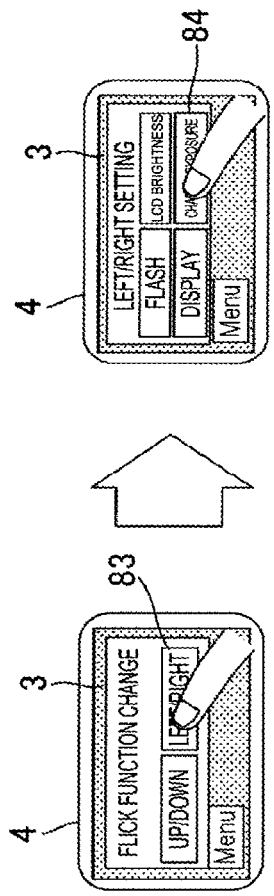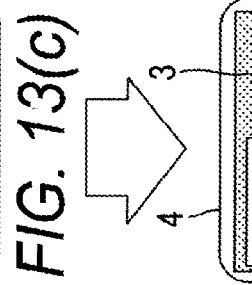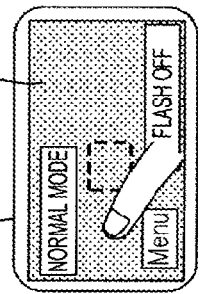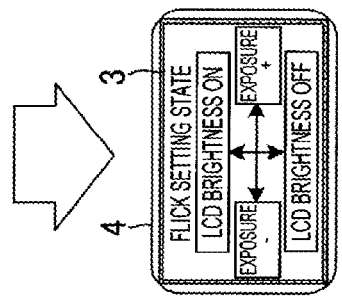

IMAGE PICKUP DEVICE AND IMAGE PICKUP METHOD

CROSS REFERENCE TO RELATED APPLICATIONS

This application is a continuation of U.S. application Ser. No. 17/078,917, filed Oct. 23, 2020, which is a continuation of U.S. application Ser. No. 16/692,546, filed Nov. 22, 2019, which is a continuation of U.S. application Ser. No. 16/379,392, filed Apr. 9, 2019, now U.S. Pat. No. 10,531,000 issued Jan. 7, 2020, which is a continuation of U.S. application Ser. No. 15/672,594, filed Aug. 9, 2017, now U.S. Pat. No. 10,306,144 issued May 28, 2019, which is a continuation of U.S. application Ser. No. 15/469,710, filed Mar. 27, 2017, now U.S. Pat. No. 9,800,785 issued Oct. 24, 2017, which is a continuation of U.S. application Ser. No. 15/340,234, filed Nov. 1, 2016, now U.S. Pat. No. 9,648,228 issued May 9, 2017, which is a continuation of U.S. application Ser. No. 15/053,611, filed Feb. 25, 2016, which is a continuation of U.S. application Ser. No. 14/642,903, filed Mar. 10, 2015, now U.S. Pat. No. 9,443,476 issued Sep. 13, 2016, which is a continuation of U.S. application Ser. No. 14/240,778, filed Feb. 25, 2014, now U.S. Pat. No. 9,094,603 issued Jul. 28, 2015, which is a National Stage Entry of International Appl. No. PCT/JP2012/006353 filed Oct. 3, 2012, which claims the benefit of Japanese Appl. Nos. 2012-018813, filed Jan. 31, 2012, 2011-273522, filed Dec. 14, 2011, 2011-228032, filed Oct. 17, 2011, and 2011-223175, filed Oct. 7, 2011. The disclosures of the above-identified documents, including the specifications, drawings and claims, are incorporated herein by reference in their entirety.

TECHNICAL FIELD

The present invention relates to an image pickup device, in which a touch panel is disposed so as to overlap a display unit that displays an image captured by a camera unit, and an image pickup method.

BACKGROUND ART

In recent years, the production of mobile terminals in which the substantially entire surface is formed by a display unit and a touch panel (liquid crystal display device or the like) and which are operated through the touch panel, such as smartphones, have been increasing in number. For this reason, the production of mobile terminals operated with hard keys have been decreasing in number.

In the mobile terminal, from the viewpoint of battery durability, the brightness of the display unit and the battery durability are balanced by performing backlight control according to ambient light using the information of an illuminance sensor or the like. In addition, the brightness up to the limit is not output in terms of the lifespan of the display device, such as a liquid crystal display device.

As conventional apparatuses in which a touch panel is disposed so as to overlap a display unit and which are operated through the touch panel, for example, there are apparatuses disclosed in Patent Document 1 and Patent Document 2. The information processing apparatus disclosed in Patent Document 1 sets the center point and the magnification when enlarging or reducing an image on the basis of one trajectory when a touch position on the display screen of the display unit is moved, so that image enlargement and reduction can be performed with a simple touch operation of drawing the trajectory with one finger. The image pickup device disclosed in Patent Document 2 includes a liquid crystal monitor with a backlight that displays an image on the basis of an image signal from a charge coupled device (CCD), a release button having a touch sensor that detects a finger touch, and light control means for turning on or off the backlight based on the determination of the touch sensor regarding whether or not a finger has touched the release button.

In addition, in the mobile terminal disclosed in Patent Document 3, when a sliding operation is performed within the operating region for a touch panel provided on the top surface of an LCD monitor that displays the operating region including a plurality of keys, the CPU determines whether or not the sliding operation is a specific operation. If it is determined that the sliding operation is a specific operation, an unresponsive region is set in a touch reaction region of the touch panel.

In addition, most smartphones described above have a communication function that enables Internet connection, and can obtain various programs provided by the 3rd generation partnership project (3GPP) and the like. Therefore, by downloading various applications other than an application installed initially (dedicated program; hereinafter, referred to as an "application"), the functions different from the application installed initially (referred to as a "pre-installed application") can be enjoyed. As the pre-installed application, for example, there is a camera application. By downloading another camera application having a different function from the camera application, the function different from the pre-installed application can be enjoyed.

RELATED ART DOCUMENTS

Patent Documents

Patent Document 1: JP-A-2010-271774
Patent Document 2: JP-A-2008-227925
Patent Document 3: JP-A-2010-009335

SUMMARY OF THE INVENTION

Problem to be Solved by the Invention

However, when using the mobile terminal, such as the smartphone described above, as a camera, there is a problem that it is difficult to view the screen of the display unit under bright environment due to external light, such as the outdoors under the clear sky, and accordingly it is difficult to determine the composition. In addition, in order to avoid this problem, a mechanism in which a function menu or the like for increasing the brightness temporarily when the mobile terminal is used as a camera is provided and a user selects the function menu. However, it is not possible to perform the setting in a situation where the screen of the display unit is not viewed from the beginning. In addition, this problem may occur not only in a mobile terminal that can be used as a camera but also in a dedicated camera (so-called digital camera).

In addition, in a mobile terminal having a large display unit, such as a smartphone, the size of the display unit has been increased so as not to change the size of the housing. As a result, the frame size has been decreased. However, as the frame size decreases, mere touching of the end of the housing may cause the mobile terminal to operate. That is, processing caused by an unintentional operation may occur. For example, when a mobile terminal has a mechanism for an auto focus (AF) operation or imaging of a camera by touch, unintentional imaging may occur just by touching the end of the housing before imaging of the camera.

In addition, when an application having a different function from the pre-installed application, such as the camera application described above, is downloaded, the user needs to perform switching between the pre-installed application and the downloaded application by icon selection on the home screen. Accordingly, there is a problem in that the operation to use these applications is complicated and accordingly it is difficult to use the applications. For example, when a scene to be imaged needs to be imaged in both the pre-installed application and the downloaded application, it is necessary to start and end the program twice. That is, assuming that switching is performed in order of the pre-installed application and the downloaded application, it is necessary to perform switching in order of start and end of the pre-installed application and start and end of the downloaded application.

This problem will be described in detail with reference to the drawings. FIG. 32 is an overview diagram showing an example of a mobile terminal that has a communication function and can download a program through a network, such as the Internet. As shown in this diagram, a plurality of icons 510 are displayed on the home screen of a terminal 500. Here, it is assumed that an application (1) is set for the icon 510 indicated by "number 1" and an application (20) is set for the icon 510 indicated by "number 20". In addition, it is assumed that the application (20) is downloaded. When using the application (1), the icon 510 indicated by "number 1" is touched. Accordingly, the application (1) starts, so that the application (1) can be used. Then, when the application (20) is used, the application (1) is stopped to return to the home screen, and then the icon 510 indicated by "number 20" is touched. Accordingly, the application (20) starts, so that the application (20) can be used. FIG. 33 is a flowchart showing this procedure.

The present invention has been made in view of the above situation, and it is an object of the present invention to provide an image pickup device and an image pickup method capable of checking the screen of a display unit easily even if the imaging is done under bright environment, such as the outdoors under the clear sky.

In addition, it is another object of the present invention to provide an image pickup device capable of preventing a malfunction caused by touching the end of the housing even if the frame of the housing becomes narrow with increase in the size of the display unit.

In addition, it is still another object of the present invention to provide an image pickup device capable of performing program switching with a simple operation.

Means for Solving the Problem

The present invention provides an image pickup device including: a camera unit; a display unit which displays an image captured by the camera unit; and a touch panel disposed so as to overlap the display unit, wherein when a predetermined operation is performed on the touch panel, a brightness of the display unit is changed from a first brightness to a second brightness brighter than the first brightness, wherein the display unit displays thereon an indication showing that the brightness has increased, and wherein the indication showing that the brightness has increased is continued even at least after changing to the second brightness.

According to the configuration described above, when a predetermined operation is performed on the touch panel, the brightness of the display unit is changed from the first brightness to the second brightness brighter than the first brightness, the display unit displays thereon the indication showing that the brightness has increased, and the indication showing that the brightness has increased is continued even at least after changing to the second brightness. Therefore, even if the imaging is done under bright environment, such as the outdoors under the clear sky, the screen of the display unit can be checked easily and reliably. In addition, after the brightness has increased, the brightness change can be reliably recognized on the basis of the indication showing that the brightness has increased.

In the configuration described above, the predetermined operation is a flick operation.

According to the configuration described above, the brightness of the display unit can be easily changed with a simple operation (flick operation) of touching the screen with a finger and sliding the finger slightly.

In the configuration described above, the display unit has a rectangular shape, and the flick operation is a flick operation along a transverse direction of the rectangular shape.

According to the configuration described above, it is possible to change the brightness of the display unit easily.

In the configuration described above, a sensor which detects a vertical direction is provided, and the flick operation is a flick operation from down to up along the vertical direction.

According to the configuration described above, when increasing the brightness of the display unit, the flick operation from down to up is performed. Therefore, an intuitive operation is possible.

In the configuration described above, assuming that the flick operation is defined as a first flick operation, when a second flick operation in an opposite direction to the first flick operation is performed, the brightness of the display unit is changed from the second brightness to the first brightness.

According to the configuration described above, when decreasing the brightness of the display unit, a flick operation from up to down is performed. Therefore, an intuitive operation is possible.

In the configuration described above, the indication showing that the brightness has increased is displayed by an icon.

According to the configuration described above, the change to the second brightness can be easily recognized.

In the configuration described above, the indication showing that the brightness has increased is displayed for a predetermined time.

According to the configuration described above, since the change to the second brightness is not missed, it can be reliably recognized that the display unit has become bright.

In the configuration described above, the image displayed on the display unit is a video image.

According to the configuration described above, it is possible to change the brightness of the display unit when capturing a video image before imaging an object (that is, before pressing a shutter).

In the configuration described above, the display unit is a liquid crystal display device with a backlight, and the brightness of the display unit is changed by changing the brightness of the backlight.

According to the configuration described above, the display unit can be made bright by changing the brightness of the backlight.

In the configuration described above, the display unit is a display device in which each pixel emits self-luminous light, and the brightness of the display unit is changed by changing the brightness of the self-luminous light.

According to the configuration described above, using a display device in which each pixel emits the self-luminous light, such as an electro luminescence (EL) display device, the display unit can be made bright by changing the brightness of self-luminous light of the display device. In addition, by using this display device, it is possible to reduce power consumption compared with a liquid crystal display device that requires a backlight.

In the configuration described above, a housing including a first surface and a second surface opposite to the first surface is provided, the camera unit is disposed on the first surface, and the display unit and the touch panel are disposed on the second surface.

In the configuration described above, a housing including a first surface and a second surface opposite to the first surface is provided, the camera unit is disposed on the first surface, and the display unit and the touch panel are disposed on the first surface.

The present invention provides an image pickup method which can be used in an image pickup device including a camera unit, a display unit which displays an image captured by the camera unit, and a touch panel disposed so as to overlap the display unit, the image pickup method, when a predetermined operation is performed on the touch panel, including: a step of changing a brightness of the display unit from a first brightness to a second brightness brighter than the first brightness; and a step of displaying on the display unit an indication showing that the brightness has increased, wherein the indication showing that the brightness has increased is continued even at least after changing to the second brightness.

According to the method described above, when a predetermined operation is performed on the touch panel, the brightness of the display unit is changed from the first brightness to the second brightness brighter than the first brightness, the display unit displays thereon the indication showing that the brightness has increased, and the indication showing that the brightness has increased is continued even at least after changing to the second brightness. Therefore, even if the imaging is done under bright environment, such as the outdoors under the clear sky, the screen of the display unit can be checked easily and reliably.

The present invention provides an image pickup program which can be used in an image pickup device including a camera unit, a display unit which displays an image captured by the camera unit, and a touch panel disposed so as to overlap the display unit, the image pickup program including: a step of changing a brightness of the display unit from a first brightness to a second brightness brighter than the first brightness when a predetermined operation is performed on the touch panel; and a step of displaying on the display unit an indication showing that the brightness has increased, wherein the indication showing that the brightness has increased is continued even at least after changing to the second brightness.

According to the image pickup program described above, when a predetermined operation is performed on the touch panel, the brightness of the display unit is changed from the first brightness to the second brightness brighter than the first brightness, the display unit displays thereon an indication showing that the brightness has increased, and the indication showing that the brightness has increased is continued even at least after changing to the second brightness. Therefore, even if the imaging is done under bright environment, such as the outdoors under the clear sky, the screen of the display unit can be checked easily and reliably.

The present invention provides a server storing the image pickup program described above so as to be downloadable.

According to the configuration described above, since it is possible to obtain an image pickup program in the form of download, it is possible to improve the convenience.

The present invention provides a display device including: a display unit which displays an image; and a touch panel disposed so as to overlap the display unit, wherein when a predetermined operation is performed on the touch panel, a brightness of the display unit is changed from a first brightness to a second brightness brighter than the first brightness, wherein the display unit displays thereon an indication showing that the brightness has increased, and wherein the indication showing that the brightness has increased is continued even at least after changing to the second brightness.

According to the configuration described above, when a predetermined operation is performed on the touch panel, the brightness of the display unit is changed from the first brightness to the second brightness brighter than the first brightness, the display unit displays thereon an indication showing that the brightness has increased, and the indication showing that the brightness has increased is continued even at least after changing to the second brightness. Therefore, even if the imaging is done under bright environment, such as the outdoors under the clear sky, the screen of the display unit can be checked easily and reliably.

The present invention provides an image pickup device including: a camera unit; a display unit which displays an image captured by the camera unit; and a touch panel disposed so as to overlap the display unit, wherein when a predetermined operation is performed on the touch panel, a gamma characteristic of the display unit is changed from a first gamma characteristic to a second gamma characteristic, wherein the display unit displays thereon an indication showing that the gamma characteristic of the display unit has been changed, and wherein the indication showing that the gamma characteristic has been changed is continued even at least after changing to the second gamma characteristic.

According to the configuration described above, when a predetermined operation is performed on the touch panel, the gamma characteristic of the display unit is changed from the first gamma characteristic (gamma characteristic of high recognizability in a dark environment) to the second gamma characteristic (gamma characteristic of high recognizability in bright environment), and the display unit displays thereon the indication showing that the gamma characteristic of the display unit has been changed, and the indication showing that the gamma characteristic has been changed is continued even at least after changing to the second gamma characteristic. Therefore, even if the imaging is done under bright environment, such as the outdoors under the clear sky, the screen of the display unit can be checked easily and reliably. In addition, after changing to the gamma characteristic of high recognizability in bright environment, the change of the gamma characteristic can be reliably recognized on the basis of the indication showing that the gamma characteristic has been changed.

The present invention provides an image pickup device including: a camera unit; a display unit that displays an image captured by the camera unit; and a touch panel disposed so as to overlap the display unit, wherein when a predetermined operation is performed on the touch panel, an imaging condition in the camera unit is changed from a first imaging condition to a second imaging condition different from the first imaging conditions.

According to the configuration described above, since the imaging condition in the camera unit is changed from the first imaging condition to the second imaging condition different from the first imaging condition when a predetermined operation is performed on the touch panel, the imaging condition in the camera unit can be quickly changed by the predetermined operation. As a result, the operability is improved. For example, a chance of missing the imaging opportunity is significantly reduced.

In the configuration described above, a synthesizing unit which performs at least one of synthesizing processing and animation processing on a first image captured under the first imaging condition and a second image captured under the second imaging condition is provided, and the first and second images after at least one of the synthesizing processing and the animation processing is performed are displayed on the display unit.

According to the configuration described above, since at least one of the synthesizing processing and the animation processing is performed on a captured image, the change in the imaging condition can be recognized intuitively. Accordingly, the operability is improved. In addition, an amusement effect is also obtained by performing the animation processing.

The present invention provides an image pickup device including: a camera unit; a flashlight unit capable of emitting light at a time of imaging of the camera unit; a display unit which displays an image captured by the camera unit; and a touch panel disposed so as to overlap the display unit, wherein when a predetermined operation is performed on the touch panel, setting of the flashlight unit is changed.

According to the configuration described above, the setting of the flashlight unit is changed when a predetermined operation is performed on the touch panel. Therefore, the setting of the flashlight unit can be changed immediately by the predetermined operation without having to open the menu or the operation of hard keys. As a result, the operability is improved. For example, a chance of missing the imaging opportunity is significantly reduced.

In the configuration described above, the setting of the flashlight unit includes at least one of auto flash, flash ON, flash OFF, and steady lighting.

According to the configuration described above, when the setting of the flashlight unit is flash ON and flash OFF, it is possible to prohibit flashing easily. Therefore, there is no bothering due to flashing at the time of imaging.

The present invention provides an image pickup device including: a camera unit; a display unit which displays an image captured by the camera unit; a touch panel disposed so as to overlap the display unit; and a storage unit which stores a predetermined operation on the touch panel in association with a function to be executed, by a setting operation on the touch panel.

According to the configuration described above, since the predetermined operation on the touch panel and a function to be executed are stored in association with each other, the function to be executed by the predetermined operation can be customized freely. Accordingly, the operability is improved.

In the configuration described above, when a second predetermined operation different from the predetermined operation is performed on the touch panel, the predetermined operation on the touch panel and the function to be executed, which are stored in the storage unit in association with each other, are read and listed on the display unit.

According to the configuration described above, when the second predetermined operation is performed on the touch panel, the predetermined operation on the touch panel and the function to be executed are listed on the display unit, it is possible to easily check the setting state of the function. Therefore, the operability is improved.

In the configuration described above, the second predetermined operation includes at least a long pressing operation.

In the configuration described above, the second imaging condition allows a plurality of imaging conditions to be changed continuously.

In the configuration described above, the predetermined operation includes at least one of a flick operation, a sliding operation, and a drag operation.

The present invention provides an image pickup device including: a camera unit; a display unit; and a touch panel disposed so as to overlap the display unit, wherein the display unit has at least a first mode in which an image captured by the camera unit is displayed, and a second mode in which a predetermined image is displayed, wherein in the first mode, the touch panel has an unresponsive region with a predetermined width in a peripheral portion of the display unit, and wherein in the second mode, the touch panel does not have the unresponsive region.

According to the configuration described above, in the first mode in which an image captured by the camera unit is displayed, the touch panel has an unresponsive region with a predetermined width in the peripheral portion of the display unit. Therefore, even if the end of the housing is touched at the time of imaging of the camera, a malfunction does not occur even if the touch point is within the unresponsive region. That is, it is possible to prevent a malfunction caused by touching the end of the housing.

The present invention provides an image pickup device including: a camera unit; a display unit; and a touch panel disposed so as to overlap the display unit, wherein the display unit has at least a first mode in which an image captured by the camera unit is displayed, and a second mode in which a predetermined image is displayed, wherein in the first mode, the touch panel has an unresponsive region with a first width in a peripheral portion of the display unit, and wherein in the second mode, the touch panel has an unresponsive region with a second width, which is smaller than the first width, in the peripheral portion of the display unit.

According to the configuration described above, the touch panel has an unresponsive region with the first width in the peripheral portion of the display unit in the first mode in which an image captured by the camera unit is displayed, and an unresponsive region with the second width smaller than the first width in the peripheral portion of the display unit in the second mode. Therefore, even if the end of the housing is touched at the time of imaging of the camera, a malfunction does not occur even if the touch point is within the unresponsive region of the first width. In addition, even if the end of the housing is touched while imaging of the camera is not performed, a malfunction does not occur if the touch point is within the unresponsive region of the second width. That is, it is possible to prevent a malfunction caused by touching the end of the housing.

In the configuration described above, the display unit has a rectangular shape, and the unresponsive region is disposed along at least one side of the rectangular shape.

In the configuration described above, in the display unit in the first mode, an icon is displayed in a range of a predetermined distance from a first side of the rectangular shape, and the unresponsive region is disposed along the first side and does not include at least a part of a region where the icon is displayed.

In the configuration described above, in the display unit in the first mode, an icon is displayed in a range of the predetermined distance from the first side of the rectangular shape, the unresponsive region includes at least a first unresponsive region disposed along the first side and a second unresponsive region disposed along a second side adjacent to the first side, and a width of the first unresponsive region is larger than a width of the second unresponsive region.

In the configuration described above, the unresponsive region is disposed along at least two opposing sides of the rectangular shape.

In the configuration described above, the unresponsive region is disposed along four sides of the rectangular shape.

In the configuration described above, a width of the unresponsive region on a short side of the rectangular shape is larger than a width of the unresponsive region on a long side of the rectangular shape.

In the configuration described above, in the first mode, the display unit displays the image captured by the camera unit on a substantially entire surface.

In the configuration described above, in the first mode, an area of the image captured by the camera unit and displayed on the display unit is equal to or greater than 80% of a total area of the display unit.

In the configuration described above, a housing covered by at least a first surface and a second surface is provided, the display unit and the touch panel are disposed on the first surface, and an edge portion is provided between the display unit and a corner between the first and second surfaces.

In the configuration described above, a width of the edge portion is greater than 0 mm and less than 3.5 mm.

In the configuration described above, the touch panel is disposed so as to overlap a substantially entire surface of the display unit.

In the configuration described above, an area of the display unit overlapped with the touch panel is 90% or more and 100% or less of an area of the display unit.

In the configuration described above, an area of the touch panel overlapped with the display unit is 90% or more and 100% or less of an area of the touch panel.

In the configuration described above, in a region of the touch panel other than the unresponsive region, an input of at least one functions (1) to (5) is received as follows:
(1) selection of an object of auto focus
(2) shutter
(3) selection of an object of electronic zoom
(4) selection of an object to adjust exposure; and
(5) selection of an object to adjust white balance.

The present invention provides an image pickup device including: a camera unit; a display unit which displays an image captured by the camera unit; and a touch panel disposed so as to overlap the display unit, wherein the image pickup device has at least a first mode and a second mode, wherein switching from the first mode to the second mode occurs by a first flick operation in a first direction, and wherein a predetermined program is allowed to be started in the second mode.

According to the configuration described above, it is possible to switch a program with a simple operation called a flick operation.

In the configuration described above, a communication unit capable of performing radio communication with an outside is provided, and the predetermined program is obtainable through the communication unit.

According to the configuration described above, a predetermined program can be easily acquired.

In the configuration described above, the predetermined program is allowed to be set by the user.

In the configuration described above, if the predetermined program is set and switching from the first mode to the second mode occurs, the predetermined program starts, and if the predetermined program is not set and switching from the first mode to the second mode occurs, an indication prompting setting of the program is displayed.

According to the configuration described above, since the indication prompting the setting of the program is displayed if the predetermined program is not set and switching from the first mode to the second mode occurs, it is possible to ensure the setting of the predetermined program.

In the configuration described above, if the predetermined program is set and switching from the first mode to the second mode occurs, the predetermined program starts, and if the predetermined program is not set and switching from the first mode to the second mode occurs, a function of prompting setting of the program starts.

According to the configuration described above, since the function of prompting the setting of the program starts if the predetermined program is not set and switching from the first mode to the second mode occurs, it is possible to ensure the setting of the predetermined program.

In the configuration described above, switching from the second mode to the first mode occurs due to a second flick operation in a second direction that is an opposite direction to the first direction.

According to the configuration described above, it is possible to return to the first mode from the second mode.

In the configuration described above, the first mode is a mode set in advance.

In the configuration described above, the display unit has a rectangular shape, and the first direction is a direction away from a predetermined side of the rectangular shape.

In the configuration described above, the first direction is a direction away from the predetermined side of the rectangular shape, and is a direction toward the center of the rectangular shape.

According to the configuration described above, since the first direction is limited, it is possible to reduce operation errors.

In the configuration described above, in the first mode, when a region of a predetermined width from the predetermined side is touched on the touch panel, display corresponding to the second mode is performed.

According to the configuration described above, since a region where display corresponding to the second mode is performed is limited, it is possible to reduce operation errors.

In the configuration described above, the display corresponding to the second mode is a graphic, an icon, or text.

In the configuration described above, after the region of the predetermined width is touched, an input of the first flick operation is allowed continuously.

According to the configuration described above, since the first flick operation can be input by touching the region, it is possible to reduce operation errors.

In the configuration described above, when the region of the predetermined width from the predetermined side is touched on the touch panel for a predetermined time, display corresponding to the second mode is performed.

According to the configuration described above, since the display corresponding to the second mode is performed by touching the region for a predetermined time, it is possible to reduce operation errors.

In the configuration described above, the first mode is a first imaging mode, and the second mode is a second imaging mode.

In the configuration described above, the first mode is a first imaging mode, and the second mode is a mode for displaying an image captured in the first imaging mode.

In the configuration described above, the first mode is a first imaging mode, and the second mode is a mode for editing an image captured in the first imaging mode.

In the configuration described above, the touch panel is disposed so as to overlap a substantially entire surface of the display unit.

In the configuration described above, an area of the display unit overlapped with the touch panel is 90% or more and 100% or less of an area of the display unit.

In the configuration described above, an area of the touch panel overlapped with the display unit is 90% or more and 100% or less of an area of the touch panel.

Advantages of the Invention

According to the present invention, even if the imaging is done under bright environment, such as the outdoors under the clear sky, the screen of a display unit can be easily and reliably checked. Therefore, it is easy to determine the composition.

In addition, according to the present invention, it is possible to prevent a malfunction caused by touching the end of the housing even if the frame of the housing becomes narrow with increase in the size of the display unit.

In addition, according to the present invention, it is possible to switch a program with a simple operation called a flick operation.

BRIEF DESCRIPTION OF THE DRAWINGS

FIGS. 10(a) to 10(e) are schematic diagrams showing an example of an imaging condition change and a flashlight setting change in the image pickup device shown in FIG. 9.

FIGS. 11(a) to 11(e) are schematic diagrams showing an example of a flick function change operation in the image pickup device shown in FIG. 9.

FIGS. 13(a) to 13(e) are schematic diagrams showing another example of the flick function change operation in the image pickup device shown in FIG. 9.

MODE FOR CARRYING OUT THE INVENTION

Hereinafter, preferred embodiments for carrying out the present invention will be described in detail with reference to the drawings.

First Embodiment

Figure 1:
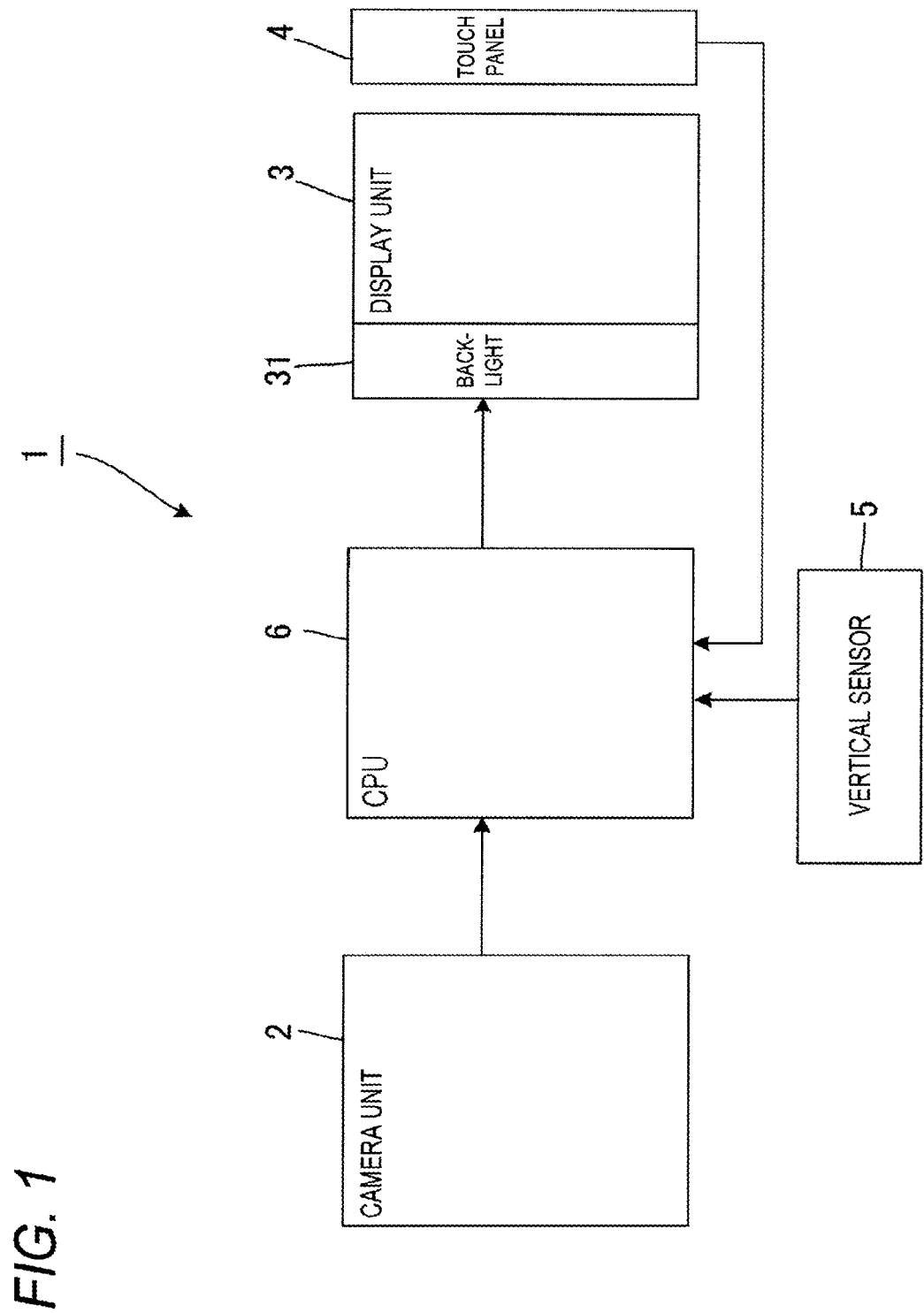
FIG. 1 is a block diagram showing the schematic configuration of an image pickup device according to a first embodiment of the present invention.
Figure 2A:
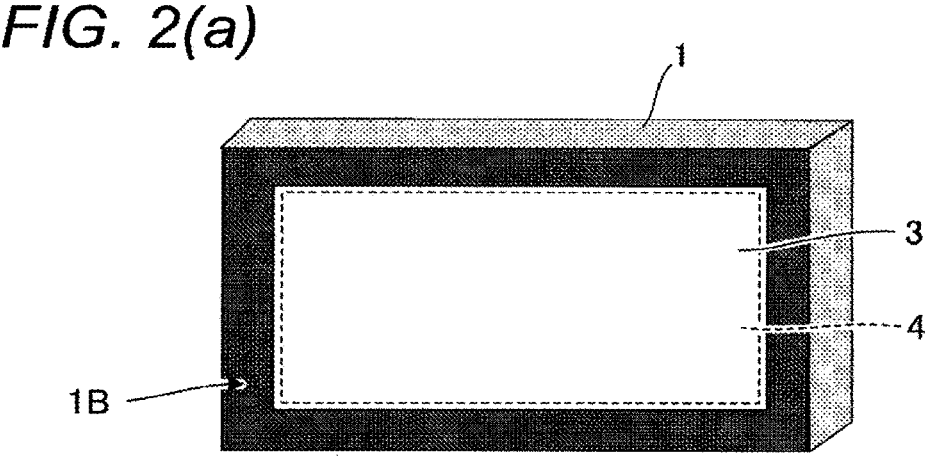
FIGS. 2(a) and 2(b) are perspective views showing an overview of the image pickup device shown in FIG. 1.
Figure 2B:
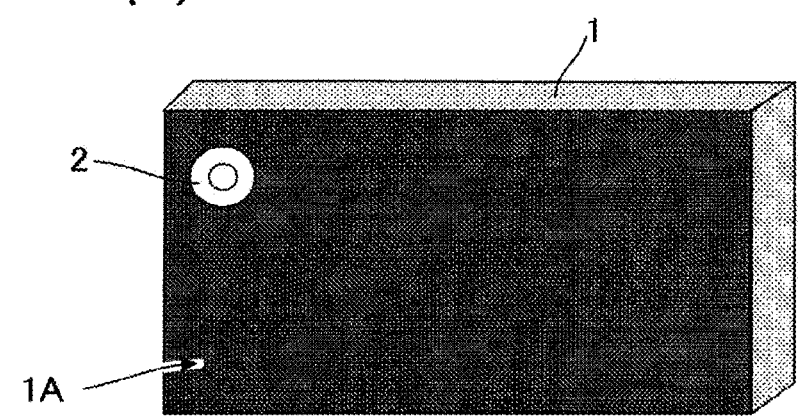

FIG. 1 is a block diagram showing the schematic configuration of an image pickup device according to a first embodiment of the present invention. FIGS. 2(a) and 2(b) are perspective views showing an overview of the image pickup device according to the present embodiment. In FIG. 1, an image pickup device 1 according to the present embodiment includes a camera unit 2, a display unit 3, a touch panel 4, a vertical sensor 5, and a central processing unit (CPU) 6. In addition, as shown in FIGS. 2(a) and 2(b), the image pickup device 1 according to the present embodiment is formed by a rectangular parallelepiped housing, and the camera unit 2 is disposed on one surface (first surface) 1A side of the housing and the display unit 3 and the touch panel 4 are disposed on the other surface (second surface) 1B side. Each of the display unit 3 and the touch panel 4 is formed in a rectangular shape.

The camera unit 2 has an imaging element (not shown), such as a CCD or a complementary metal oxide semiconductor (CMOS), and generates and outputs an image signal of an object formed on the imaging element. The display unit 3 is a liquid crystal display device including a backlight 31, and displays an image captured by the camera unit 2. On the display unit 3, a video image is displayed before capturing an object (that is, before pressing a shutter), and a still image is temporarily displayed after the object is captured. In addition, a video image is displayed when reproducing the captured video image, and a still image is displayed when reproducing the captured still image. In addition, although not shown, the image pickup device 1 according to the present embodiment has a memory such as a flash memory that stores captured video images or still images. The brightness of the display unit 3 is changed by changing the brightness of the backlight 31.

The touch panel 4 is disposed so as to overlap the display surface of the display unit 3 on the opposite side to the backlight 31, and outputs the information on the position where the finger or the like of a person has touched. The vertical sensor 5 is used to detect the vertical direction of the image pickup device 1, and outputs a signal of a level corresponding to the direction of the image pickup device 1. A sensor signal of the vertical sensor 5 is maximized when the image pickup device 1 is aligned in the vertical direction. The CPU 6 controls each unit of the apparatus, and has a ROM and a RAM (not shown). A program for controlling the CPU 6 is stored in the ROM. The RAM is a so-called work memory used in the operation of the CPU 6.

When a predetermined operation is performed on the touch panel 4, the CPU 6 changes the brightness of the backlight 31 of the display unit 3 from the first brightness to the second brightness brighter than the first brightness. In addition, the CPU 6 displays on the display unit 3 an indication showing that the brightness has increased when the brightness of the backlight 31 is changed to the second brightness. In this case, the CPU 6 continues the indication showing that the brightness has increased, for a predetermined time after changing to the second brightness so that the user does not miss the change to the second brightness.

Figure 3A:
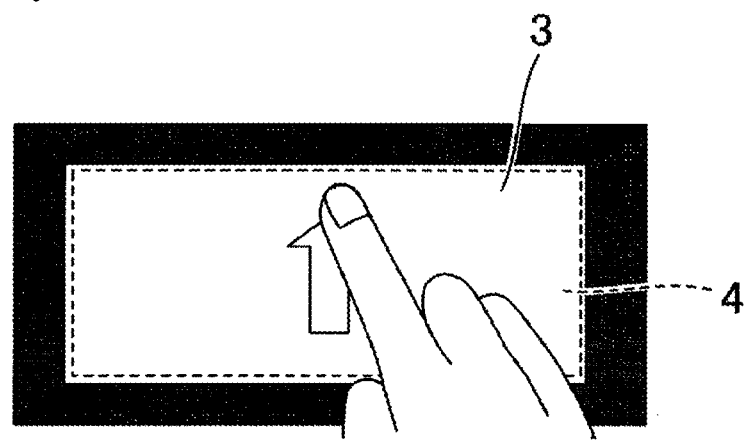
FIGS. 3(a) and 3(b) are diagrams for explaining an operation of changing the brightness of a display unit of the image pickup device shown in FIG. 1.
Figure 3B:
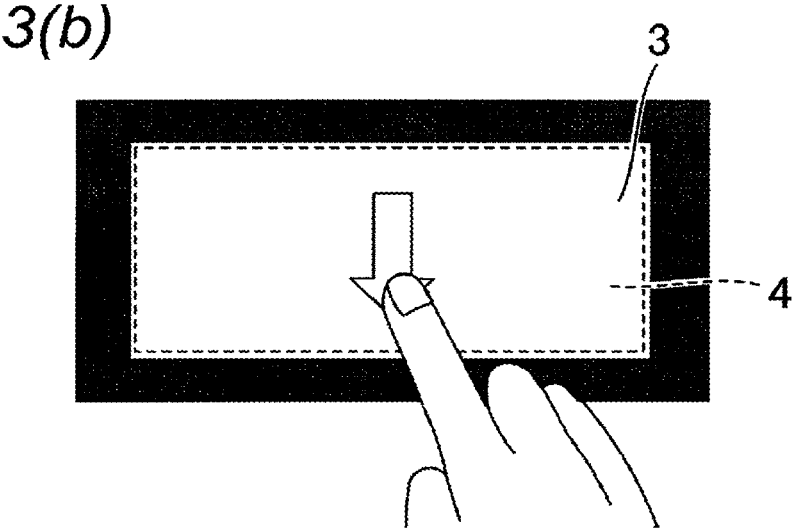

FIGS. 3(a) and 3(b) are diagrams showing examples of the operation when changing the brightness of the display unit 3. As shown in FIG. 3(a), when a fingertip is placed on the touch panel 4 and is slid slightly upward in the lateral direction of the display unit 3, the brightness of the backlight 31 of the display unit 3 changes from the first brightness to the second brightness. In addition, as shown in FIG. 3(b), when a fingertip is placed on the touch panel 4 and is slid slightly downward in the lateral direction of the display unit 3 in a state where the brightness of the backlight 31 of the display unit 3 has changed to the second brightness, the brightness of the backlight 31 of the display unit 3 changes from the second brightness to the first brightness. Such an operation is called a flick operation. Brightness adjustment can be intuitively performed by moving the fingertip upward when increasing the brightness of the backlight 31 of the display unit 3 and moving the fingertip downward when decreasing the brightness.

In the present embodiment, the flick operation described above may be made to have a feature for the sliding speed (amount of movement per unit time). That is, in the image pickup device of the present embodiment, there may be other flick operations for starting, for example, other applications in addition to the flick operation. In this case, the sliding speed of the flick operation may be set higher than the sliding speed of other flick operations.

Accordingly, the flick operation and other flick operations can be distinguished by the difference in sliding speed. As a result, it is possible to prevent an erroneous operation in which the brightness is changed by other flick operations (including a simple touch operation).

In the present embodiment, the flick operation when changing the brightness of the display unit 3 is effective only while the vertical direction is detected by the vertical sensor 5. That is, the CPU 6 enables the flick operation for changing the brightness of the display unit 3 only while the vertical sensor 5 is detecting the vertical direction. In addition, since imaging may occur with the imaging direction downward or imaging may occur with the imaging direction upward, the conditions of the vertical sensor 5 may be released.

Figure 4:
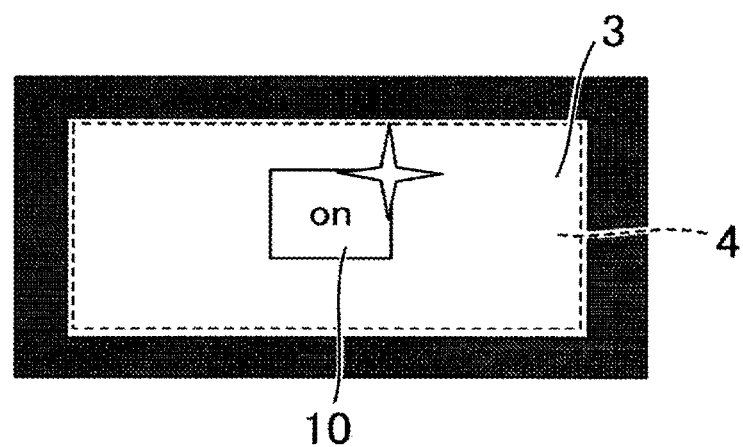
FIG. 4 is a diagram showing an example of an indication showing that the display unit of the image pickup device shown in FIG. 1 has become bright.

FIG. 4 is a diagram showing an example of an indication showing that the brightness of the display unit 3 has increased. As shown in this diagram, the indication showing that the brightness of the display unit 3 has increased is displayed by an icon 10. By displaying the fact that the brightness of the display unit 3 has increased, the user can easily recognize that the display unit 3 has changed to the second brightness. In addition, since the display is continued for a predetermined time, the user does not miss the change to the second brightness. As a result, the user can reliably recognize that the brightness of the display unit 3 has increased.

In addition, the predetermined time may be set to start before the brightness increases and continue even after the increase in the brightness. In this case, it is possible to recognize the icon display immediately after the brightness increases.

In addition, the brightness may be set to increase gradually. In this case, the predetermined time may be set to start before the brightness increases and continue even after the brightness has increased (that is, after the brightness becomes fixed). Accordingly, it is possible to recognize the icon display immediately after the brightness has increased enough to recognize the icon display.

Next, the operation of the image pickup device 1 according to the present embodiment will be described.

Figure 5:
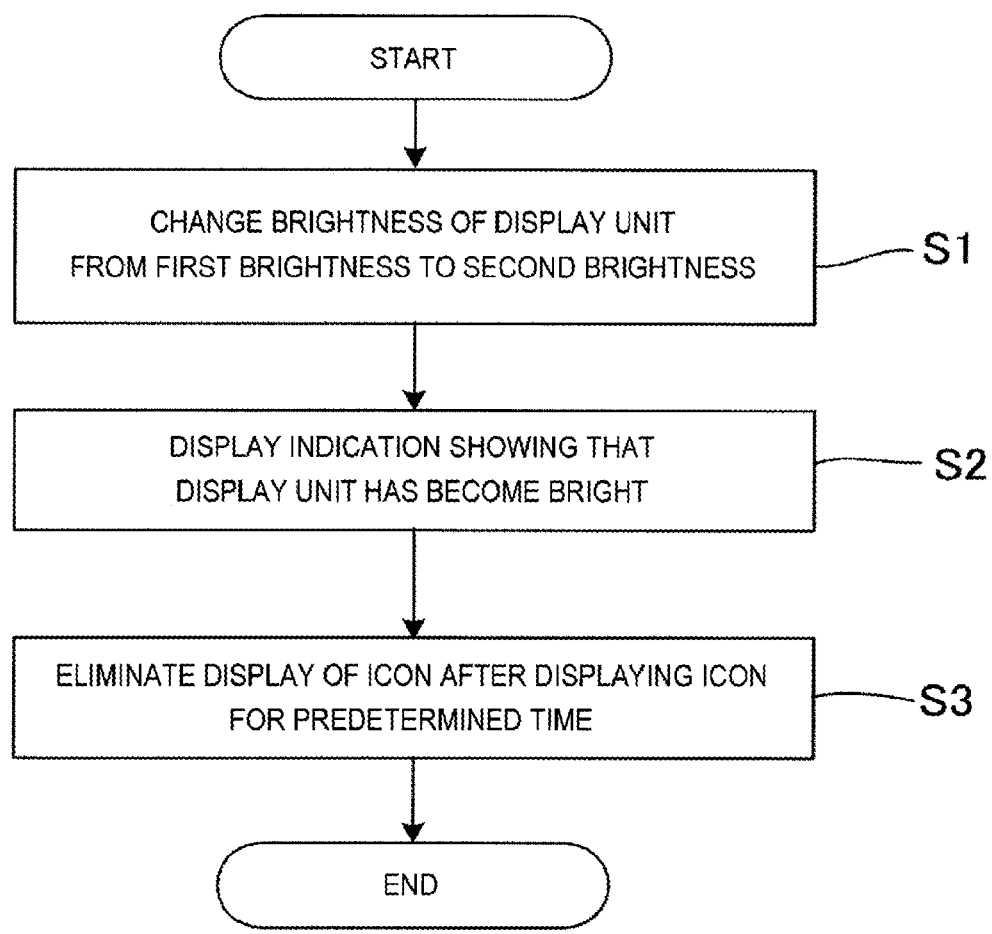
FIG. 5 is a flowchart for explaining the brightness change process of the display unit of the image pickup device shown in FIG. 1.

FIG. 5 is a flowchart for explaining the operation at the time of brightness control in the image pickup device 1 according to the present embodiment. In this diagram, when the flick operation from down to up along the vertical direction is detected in a state where the vertical sensor 5 detects the vertical direction, the CPU 6 changes the brightness of the display unit 3, that is, the brightness of the backlight 31, from the first brightness to the second brightness (step S1). Then, the CPU 6 displays on the display unit 3 that the display unit 3 has become bright (step S2). That is, the icon 10 shown in FIG. 4 is displayed on the display unit 3. After displaying the icon 10 continuously for a predetermined time, the display of the icon 10 is eliminated (step S3), and this process ends.

Thus, according to the image pickup device 1 according to the present embodiment, a flick operation from down to up along the vertical direction is performed on the touch panel 4, the brightness of the display unit 3 is changed from the first brightness to the second brightness brighter than the first brightness, the display unit 3 displays thereon the indication showing that the brightness has increased using the icon 10, and the display of the icon 10 is continued even after changing to the second brightness. Accordingly, even if the imaging is done under bright environment, such as the outdoors under the clear sky, the screen of the display unit 3 can be checked easily and reliably.

In addition, although the display unit 3 of the image pickup device 1 according to the present embodiment is a liquid crystal display device having the backlight 31, the display unit 3 may also be a display device in which each pixel emits self-luminous light. In this case, the brightness of the display unit is changed by changing the brightness of self-luminous light. As a display device in which each pixel emits self-luminous light, for example, there is an EL display device. By using this display device, it is possible to reduce power consumption compared with a liquid crystal display device that requires a backlight.

Figure 6:
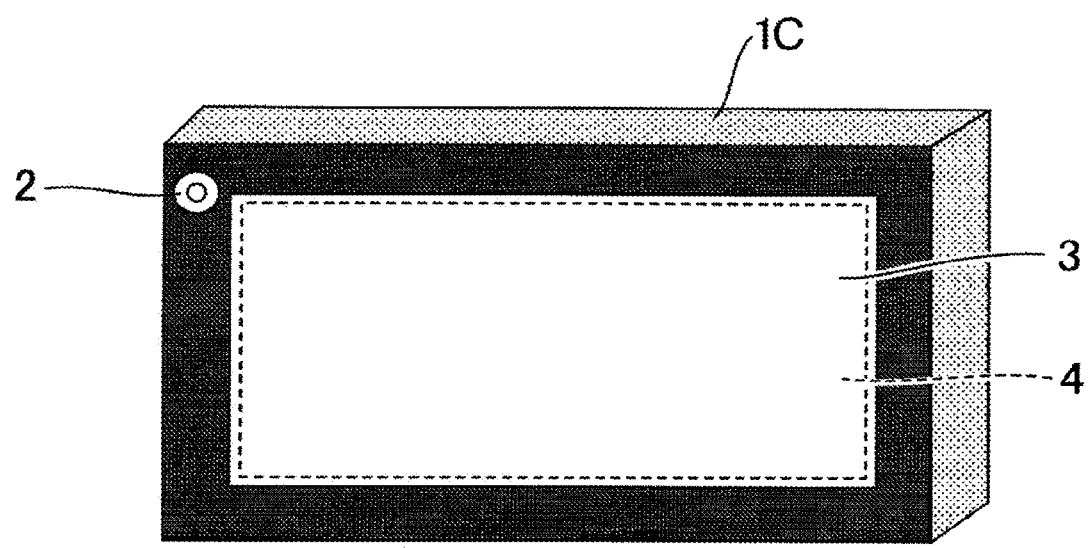
FIG. 6 is a perspective view showing an overview of an image pickup device that is a modification of the image pickup device shown in FIG. 1.

In addition, in the image pickup device 1 according to the present embodiment, the camera unit 2 is disposed on the opposite surface to a surface on which the display unit 3 and the touch panel 4 are disposed. However, the camera unit 2 may be disposed on the same surface. Using two camera units 2, one of them may be disposed on the surface on which the display unit 3 and the touch panel 4 are disposed, and the other one may be disposed on the opposite surface. FIG. 6 is a perspective view showing an overview of an image pickup device 10 in which the camera unit 2 is disposed on the surface side on which the display unit 3 and the touch panel 4 are disposed.

In addition, a program describing the process in the image pickup device 1 according to the present embodiment may be distributed in a state being stored in storage media, such as a magnetic disk, an optical disc, a magneto-optical disc, and a semiconductor memory, or may be stored in a server (not shown) on the network, such as the Internet, and be downloaded using the electrical communication line.

Figure 7:
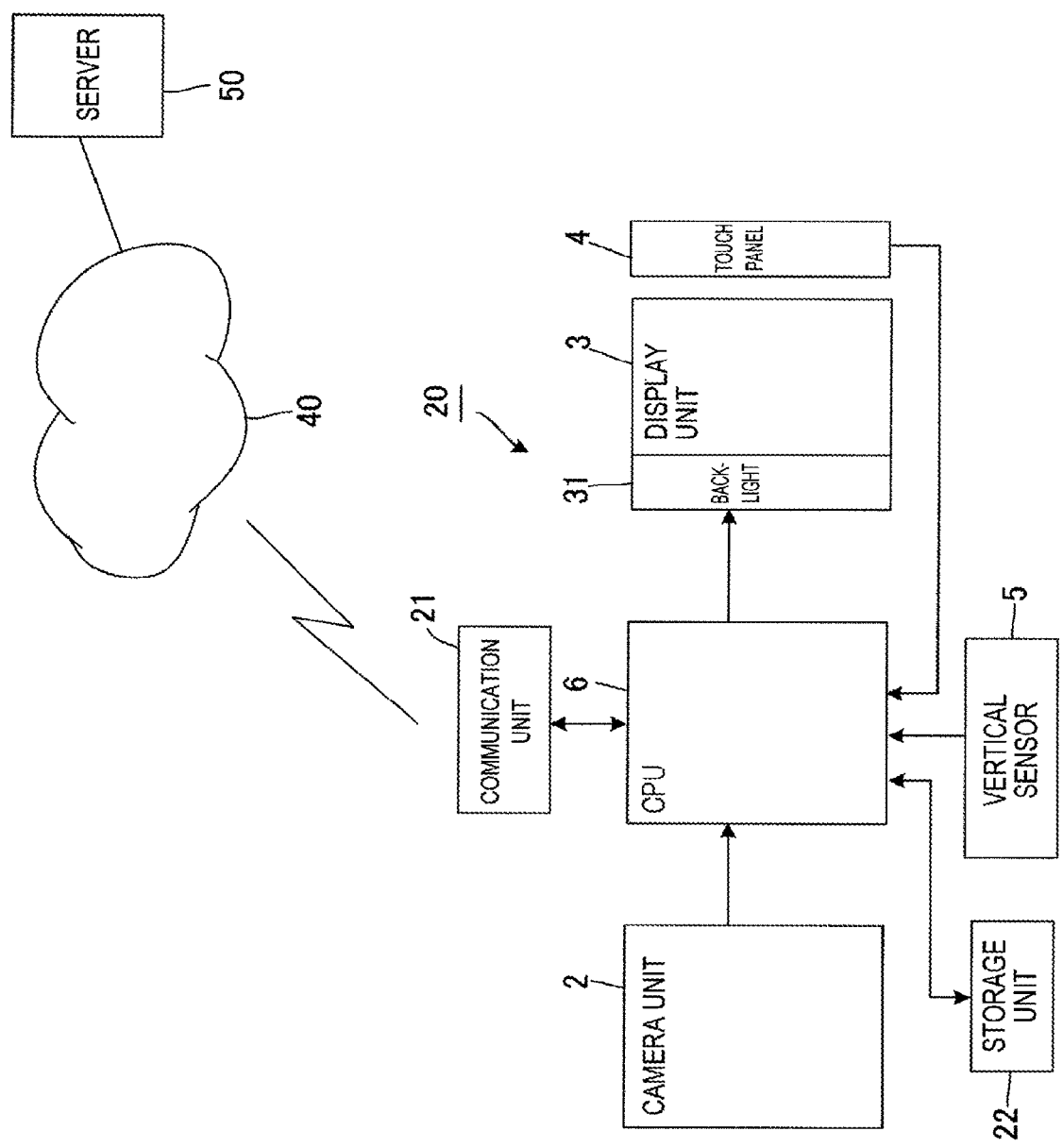
FIG. 7 is a block diagram showing the schematic configuration of an image pickup device that is an application example of the image pickup device shown in FIG. 1.

FIG. 7 is a block diagram showing the schematic configuration of an image pickup device that is an application example of the image pickup device 1 according to the present embodiment. An image pickup device 20 shown in this diagram is formed by adding a communication unit 21 and a storage unit 22 to the image pickup device 1 described above, so that a program stored in a server on the Internet can be downloaded. The CPU 6 accesses a server 50 on the Internet 40 through the communication unit 21, and downloads a program (program embodying the flowchart shown in FIG. 5) stored in the server 50. In addition, the downloaded program is stored in the storage unit 22. The CPU 6 uses, for example, transmission control protocol/Internet protocol (TCP/IP) and hyper text transfer protocol (HTTP) as protocols required for the exchange of data using a network, such as the Internet. The CPU 6 establishes a communication path using the TCP/IP, and transmits and receives data using the HTTP.

Figure 8:
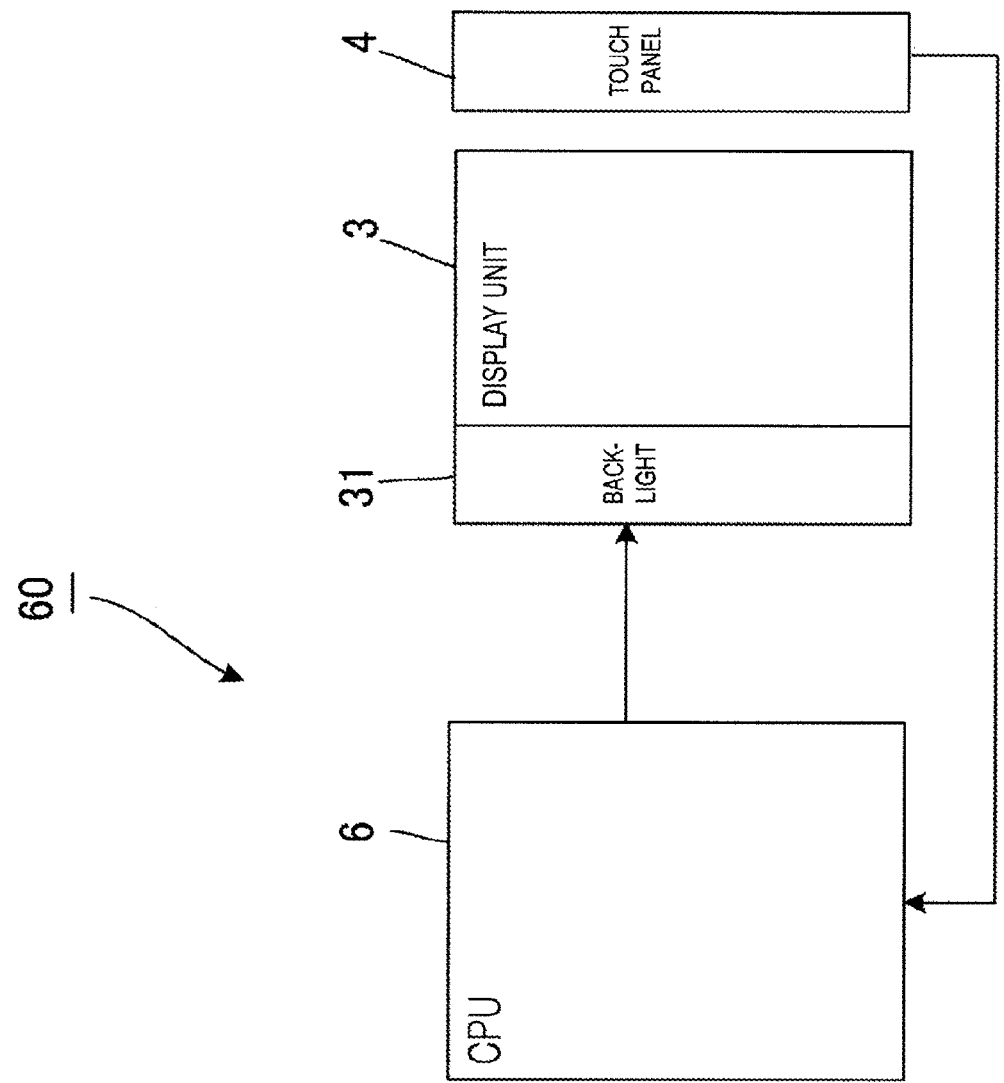
FIG. 8 is a block diagram showing the schematic configuration of a display device that is an application example of the image pickup device shown in FIG. 1.

In addition, a display device may be made to have functions equivalent to the image pickup device 1 according to the present embodiment. FIG. 8 is a block diagram showing the schematic configuration of a display device 60 that is an application example of the image pickup device 1 according to the present embodiment. In addition, in this diagram, the same reference numerals are given to portions common to FIG. 1 described above. The display device 60 shown in this diagram includes a display unit 3 that displays an image and a touch panel 4 disposed so as to overlap the display unit 3. When a predetermined operation is performed on the touch panel 4, the brightness of the display unit 3 is changed from the first brightness to the second brightness brighter than the first brightness, the display unit 3 displays thereon the indication showing that the brightness has increased, and the indication showing that the brightness has increased is continued even at least after changing to the second brightness. In addition, for example, a video image obtained by receiving a television broadcast may be displayed on the display unit 3.

In addition, the image pickup device of the present invention may also be applied to an apparatus having functions other than the imaging function, such as a smartphone. That is, such an image pickup device has an imaging mode and modes of other functions.

In the imaging mode, as described so far, when a predetermined operation is performed on the touch panel, the brightness of the display unit is the second brightness continuously after being changed from first brightness to the second brightness brighter than the first brightness. However, when a change to another function mode is made while the brightness of the display unit is the second brightness continuously, a change to brightness (example: first brightness) darker than the second brightness may be made. Accordingly, in function modes other than the imaging mode, the brightness is decreased, and power consumption of the image pickup device can be reduced. As a result, in the case of an image pickup device operating with a battery, it is possible to lengthen the operating time.

In addition, when a change to the imaging mode is made again, the reduced brightness (example: first brightness) may be maintained. In this case, since it is possible to reduce the frequency to become the second brightness, it is possible to further reduce the power consumption of the image pickup device. Therefore, in the case of an image pickup device operating with a battery, it is possible to further lengthen the operating time.

Second Embodiment

In addition, an image pickup device of another embodiment includes a camera unit, a display unit that displays an image captured by the camera unit, and a touch panel disposed so as to overlap the display unit. When a predetermined operation is performed on the touch panel, the gamma characteristic of the display unit is changed from the first gamma characteristic to the second gamma characteristic, and the display unit displays thereon an indication showing that the gamma characteristic of the display unit has been changed. The indication showing that the gamma characteristic has been changed may be continued even at least after changing to the second gamma characteristic.

According to this configuration, when a predetermined operation is performed on the touch panel, the gamma characteristic of the display unit is changed from the first gamma characteristic (gamma characteristic of high recognizability in a dark environment) to the second gamma characteristic (gamma characteristic of high recognizability in bright environment), the display unit displays thereon the indication showing that the gamma characteristic of the display unit has been changed, and the indication showing that the gamma characteristic has been changed is continued even at least after changing to the second gamma characteristic. Therefore, even if the imaging is done under bright environment, such as the outdoors under the clear sky, the screen of the display unit can be checked easily and reliably. In addition, after changing to the gamma characteristic of high recognizability in bright environment, the change of the gamma characteristic can be reliably recognized on the basis of the indication showing that the gamma characteristic has been changed.

Third Embodiment

Figure 9:
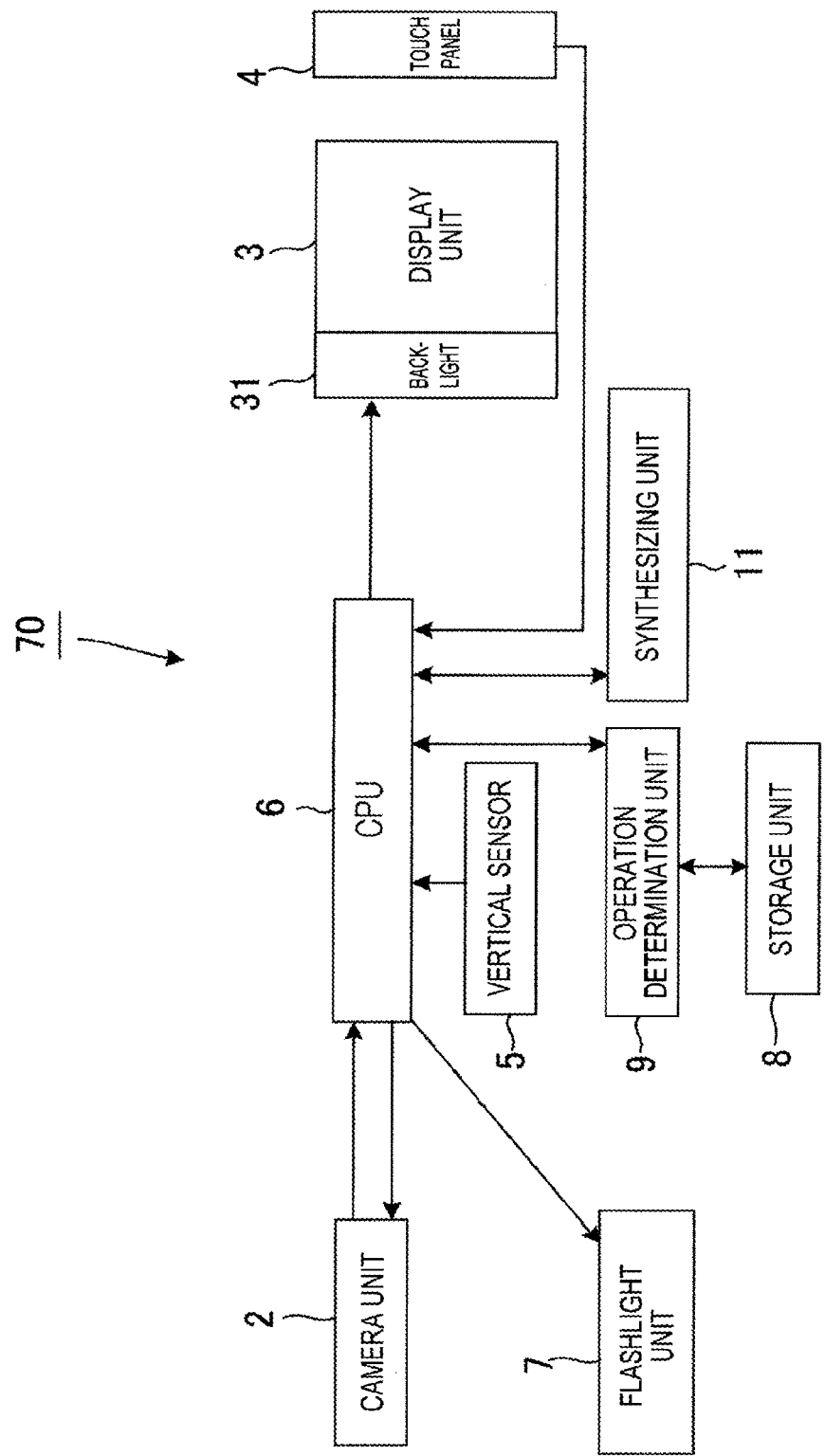
FIG. 9 is a block diagram showing the schematic configuration of an image pickup device according to a third embodiment of the present invention.

FIG. 9 is a block diagram showing the schematic configuration of an image pickup device according to a third embodiment of the present invention. In addition, in this diagram, the same reference numerals are given to portions common to the image pickup device 1 according to the first embodiment described above. An image pickup device 70 according to the third embodiment includes a camera unit 2, a display unit 3, a touch panel 4, a vertical sensor 5, a CPU 6, a flashlight unit 7, a storage unit 8, an operation determination unit 9, and a synthesizing unit 11.

The camera unit 2 has an imaging element (not shown), such as a CCD or a CMOS, and generates and outputs an image signal of an object formed on the imaging element. The display unit 3 is a liquid crystal display device (LCD) including a backlight 31, and displays an image captured by the camera unit 2. On the display unit 3, a video image is displayed before capturing an object (that is, before pressing a shutter), and a still image is temporarily displayed after the object is captured. In addition, a video image is displayed when reproducing the captured video image, and a still image is displayed when reproducing the captured still image.

The flashlight unit 7 is emission-controlled by the CPU 6. The storage unit 8 stores the flick operation on the touch panel 4 and the function to be executed in association with each other. A rewritable nonvolatile semiconductor memory (for example, a flash memory) is used as the storage unit 8. The operation determination unit 9 determines the flick operation on the basis of the output information of the touch panel 4 that is output from the CPU 6. if a function corresponding to the determined flick operation is stored in the storage unit 8, the operation determination unit 9 outputs the function to the CPU 6. In addition, the operation determination unit 9 stores the flick operation on the touch panel 4 and the function to be executed in association with each other in the storage unit 8 by a setting operation on the touch panel 4.

When a flick operation is performed on the touch panel 4, the CPU 6 changes the imaging conditions in the camera unit 2 from the current imaging conditions (first imaging conditions) to different imaging conditions (second imaging conditions) from the current imaging conditions. In this case, examples of the imaging conditions include "scene" and "effect". There are modes, such as "person", "portrait", "landscape", and "party", in the "scene", and there are modes, such as "sepia", "software", "monochrome", "high key", and "low key", in the "effect". The CPU 6 changes, for example, the setting of the flashlight unit 7 when it is recognized that the flick operation has been performed on the touch panel 4. "auto flash", "flash ON", "flash OFF", and "steady lighting" are included in the setting of the flashlight unit 7. By making the setting of the flashlight unit 7 correspond to the flick operation, a setting change can be performed immediately without having to open the menu or the operation of hard keys. Accordingly, an effect that a chance of missing the imaging opportunity is significantly reduced is obtained. In addition, by setting the downward flick operation to "flash OFF", it is possible to prohibit flashing easily. In this case, there is no bothering due to flashing at the time of imaging.

The synthesizing unit 11 performs synthesizing or animation processing on an image (corresponding to a first image) captured by the current imaging conditions (corresponding to first imaging conditions) and an image (corresponding to a second image) captured by the imaging conditions (corresponding to second imaging conditions) after the change of the imaging conditions. That is, the synthesizing unit 11 performs synthesizing or animation processing using an image under the current imaging conditions and an image under the changed imaging conditions in order to show the effect of turning a page when changing the imaging conditions. In addition, only one of the synthesizing processing and the animation processing may be performed, or both the synthesizing processing and the animation processing may be performed.

The CPU 6 displays two images (first and second images), which are obtained by the synthesizing or animation processing of the synthesizing unit 11, on the display unit 3. By the process of the synthesizing unit 11, changes in the imaging conditions (effect before and after the change), such as page turning, are understood by a change of the image displayed on the display unit 3. Accordingly, changes in the imaging conditions can be intuitively recognized. In addition, an amusement effect is also obtained by performing the animation processing.

FIGS. 10(a) to 10(e) are schematic diagrams showing an example of an imaging condition change and a flashlight setting change. When the flick operation is performed rightward on the touch panel 4 as shown in FIG. 10(b) in a state where "normal mode" is set as shown in FIG. 10(a), a gradual change from an image showing "normal mode (corresponding to the first imaging conditions)" to an image showing "sepia mode (corresponding to the second imaging conditions)" is made in a sense of turning the page. Finally, as shown in FIG. 10(c), an image showing "sepia mode" appears, and "sepia mode" is set. In addition, the flick operation may occur leftward on the touch panel 4 when returning to "normal mode" from "sepia mode". Thus, the leftward flick operation and the rightward flick operation are set to change the imaging conditions. In this case, by performing the flick operation rightward, a change from "normal mode" to imaging conditions present as "sepia mode", "software", and "monochrome" can be made consecutively. In addition, the imaging conditions are changed in the reverse order from "sepia mode" to "normal mode" by performing the flick operation leftward in the state of "sepia mode".

On the other hand, when the flick operation is performed upward on the touch panel 4 as shown in FIG. 10(d) in a state where "flash OFF" is set as shown in FIG. 10(a), an animation showing "flash ON" is displayed. Finally, as shown in FIG. 10(e), "flash ON" is set. The flick operation may occur downward when returning to "flash OFF" from the state where "flash ON" is set. Thus, the upward flick operation and the downward flick operation are set to "flash OFF" and "flash ON". In this case, by performing the flick operation upward, the flashlight setting is changed from "flash OFF" to "flash ON". In addition, the flashlight setting is changed from "flash ON" to "flash OFF" by performing the flick operation downward in the state of "flash ON".

If the flick operation and the function to be executed are stored in association with each other in the storage unit 8, the setting can be easily changed without calling the menu.

FIGS. 11(*a*) to 11(*e*) are schematic diagrams showing an example of a flick function change operation. These diagrams are an example of setting the brightness of the display unit 3 according to a flick operation in a vertical direction. First, as shown in FIG. 11(*a*), a menu button 80 is touched in the initial screen. Then, as shown in FIG. 11(*b*), a flick function change screen is displayed. When an up/down button 81 is touched in the flick function change screen, an up/down direction setting screen is displayed as shown in FIG. 11(*c*). When an LCD brightness button 82 is touched in the up/down direction setting screen, the LCD brightness is set in the vertical direction of the flick operation. When the LCD brightness setting is completed, the screen returns to the initial screen.

Figure 12:
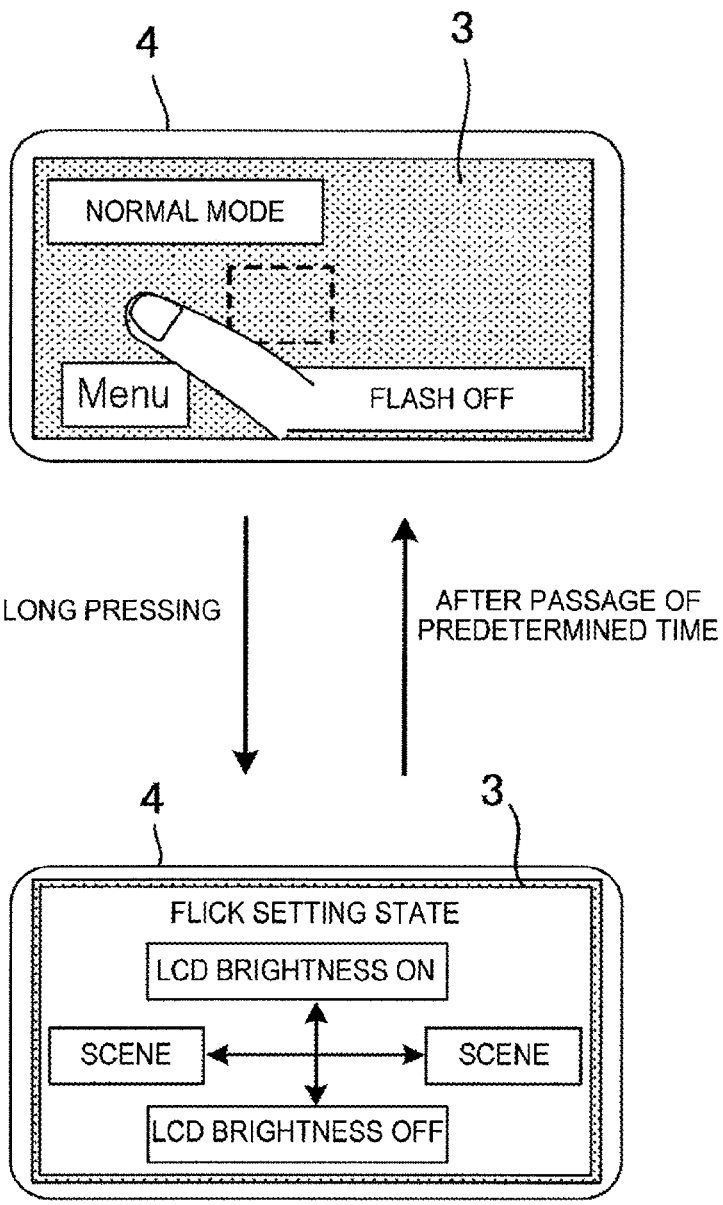
FIG. 12 is an enlarged view of FIGS. 11(d) and 11(e).

In order to check the set function, the touch panel 4 is pressed long in the initial screen as shown in FIG. 11(*d*) (arbitrary position on the touch panel 4 is pressed long). Then, as shown in FIG. 11(*e*), a flick setting state is displayed. In this diagram, the LCD brightness is set in the vertical direction, and a scene is set in the horizontal direction. For the LCD brightness setting, an upward direction is set to LCD brightness ON, and a downward direction is set to LCD brightness OFF. When a predetermined time has passed from the display of the flick setting state, the screen returns to the initial screen. FIG. 12 is enlarged views of FIGS. 11(*d*) and 11(*e*), where a flick setting state is displayed by pressing the touch panel 4 long in the initial screen and the screen returns to the initial screen after the passage of predetermined time.

The operation when pressing the touch panel 4 long is as follows.

When the operation determination unit 9 recognizes that the output of the touch panel 4 takes the same value for a fixed time, the operation determination unit 9 reads from the storage unit 8 the flick operation on the touch panel 4 and the function to be executed and outputs them to the CPU 6 as a current setting menu state. The CPU 6 lists the current setting menu state, which is output from the operation determination unit 9, on the display unit 3.

FIGS. 13(*a*) to 13(*e*) are schematic diagrams showing another example of the flick function change operation. These diagrams are an example of setting the exposure of the camera unit 2 according to a flick operation in a horizontal direction. First, as shown in FIG. 13(*a*), the menu button 80 is touched in the initial screen. Then, as shown in FIG. 13(*b*), a flick function change screen is displayed. When a left/right button 83 is touched in the flick function change screen, a left/right direction setting screen is displayed as shown in FIG. 13(*c*). When an exposure change button 84 is touched in the left/right direction setting screen, the exposure (+, −) is set in the horizontal direction of the flick operation. When the setting of the exposure (+, −) is completed, the screen returns to the initial screen.

In order to check the set function, an arbitrary position is pressed long in the initial screen as shown in FIG. 13(*d*) (arbitrary position on the touch panel 4 is pressed long).

Then, as shown in FIG. 13(*e*), a flick setting state is displayed. In this diagram, the LCD brightness is set in the vertical direction, and the exposure (+, −) is set in the horizontal direction. For the setting of the exposure (+, −), the right direction is exposure+, and the left direction is exposure−. When a predetermined time has passed from the display of the flick setting state, the screen returns to the initial screen.

When the touch panel 4 is pressed long and the operation determination unit 9 recognizes that the output of the touch panel 4 takes the same value for a fixed time as described above, the operation determination unit 9 reads from the storage unit 8 the flick operation on the touch panel 4 and the function to be executed and outputs them to the CPU 6 as a current setting menu state. The CPU 6 lists the current setting menu state, which is output from the operation determination unit 9, on the display unit 3.

Thus, by graphically listing the default function or the assignment of a flick function customized by the user, the user can easily check what kind of function is executed.

Next, the operation of an image pickup device 70 according to a third embodiment will be described.

Figure 14:
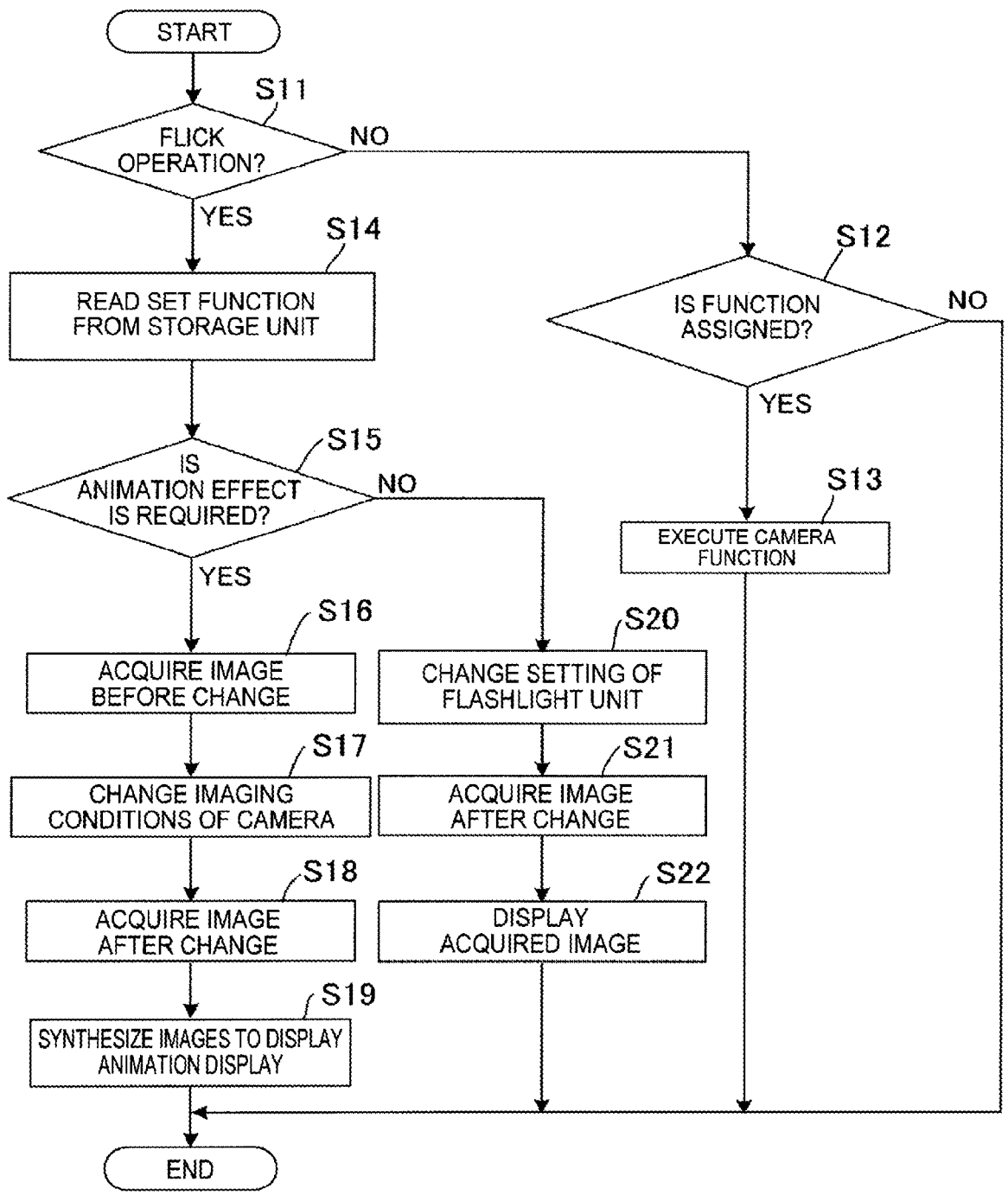
FIG. 14 is a flowchart showing a page turning process performed by the flick operation of the image pickup device shown in FIG. 9 and a flashlight change process performed by the flick operation in a vertical direction.

FIG. 14 is a flowchart showing a page turning process performed by the flick operation of the image pickup device 70 according to the third embodiment and a flashlight change process performed by the flick operation in a vertical direction. The process is performed mainly by the CPU 6 and the operation determination unit 9. In particular, the CPU 6 and the operation determination unit 9 may perform the process together. Accordingly, the subject will be omitted.

In FIG. 14, it is determined whether or not a flick operation has been performed on the touch panel 4 (step S11). When it is determined that no flick operation has been performed (that is, when "NO" is determined in the determination of step S11), it is determined whether or not a function is assigned to the current operation (step S12). When it is determined that a function is assigned to the current operation in the determination of step S12 (that is, when "YES" is determined in the determination of step S12), a camera function corresponding to the function is executed (step S13). As the camera function, for example, there is a function of executing the touch Auto Focus (AF) by touching the touch panel 4.

After executing the camera function, this process ends. On the other hand, when it is determined that no function is assigned to the current operation (that is, when "NO" is determined in the determination of step S12), this process ends without performing any processing.

On the other hand, when it is determined that a flick operation has been performed on the touch panel 4 in the determination of step S11 described above (that is, when "YES" is determined in the determination of step S11), the set function is read from the storage unit 8 (step S14). After reading the set function from the storage unit 8, it is determined whether or not the animation effect is required (step S15). That is, it is determined whether or not to change the imaging conditions in the page turning. When it is determined that the animation effect is required in this determination (that is, when "YES" is determined in step S15), an image before the imaging conditions are changed is acquired (step S16), and then the imaging conditions in the camera unit 2 are changed (step S17). For example, a change from the normal mode to the sepia mode is made.

Then, an image after the imaging conditions are changed is acquired (step S18), and then the acquired images before and after the change of the imaging conditions are synthesized to perform animation display (step S19).

When it is determined that the animation effect is not required in the determination of step S15 described above (that is, when "NO" is determined in step S15), the setting of the flashlight unit 7 is changed (step S20). Then, an image after the setting change is acquired (step S21), and the acquired image is displayed (step S22). After performing processing for displaying this image, this process ends.

Figure 15:
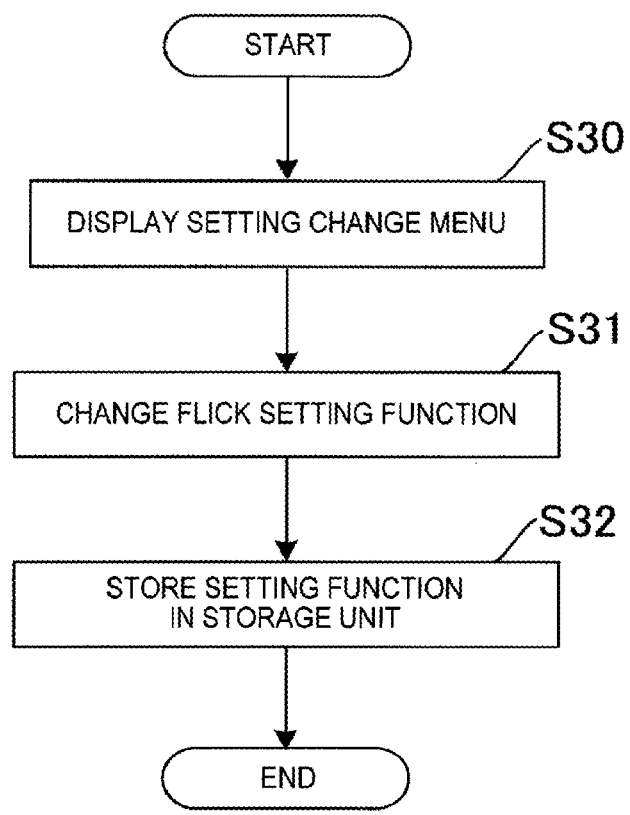
FIG. 15 is a flowchart showing a flick setting change process of the image pickup device shown in FIG. 9.

FIG. 15 is a flowchart showing a setting change process performed by the flick operation. This process is also performed mainly by the CPU 6 and the operation determination unit 9. In particular, the CPU 6 and the operation determination unit 9 may perform the process together. Accordingly, the subject will be omitted. In FIG. 15, a setting change menu is displayed first (step S30). Examples of the setting change menu are those shown in FIGS. 11(b) and 11(c). Then, the flick setting function is changed (step S31). The user can perform an operation according to the setting change menu so that the flick operation in the vertical direction is set to "brightness change of liquid crystal" and the flick operation in the horizontal direction is set to "scene" or the flick operation in the vertical direction is set to "ON/OFF setting of flashlight" and the flick operation in the horizontal direction is set to "change of exposure correction". After changing the flick setting function, the setting function is stored in the storage unit 8 (step S32). After storing the setting function in the storage unit 8, this process ends.

Figure 16:
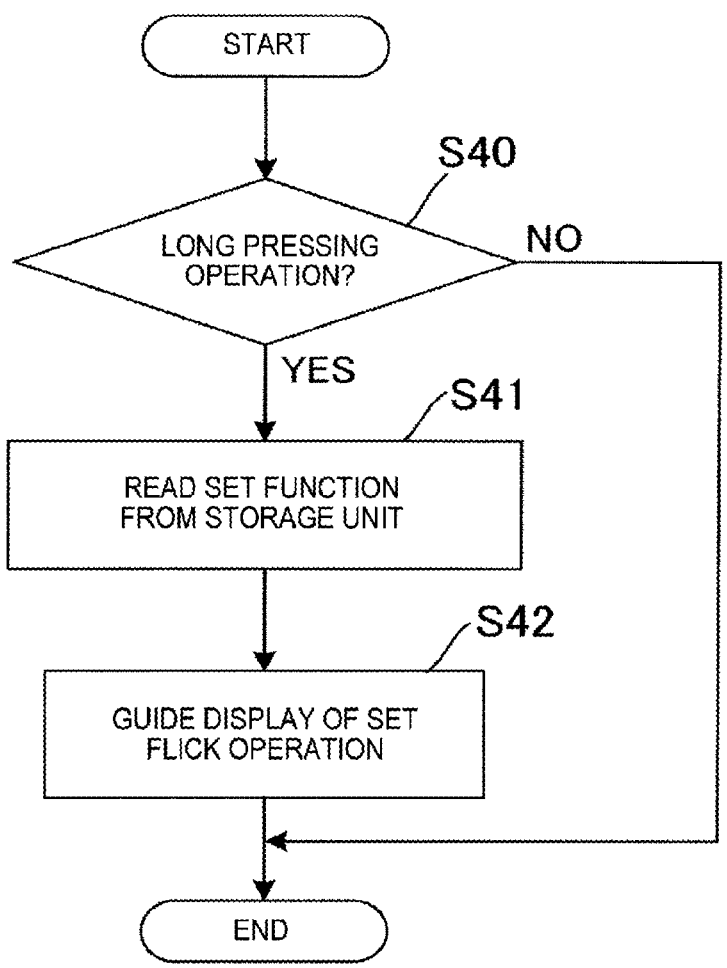
FIG. 16 is a flowchart showing a guide display process performed by the long pressing operation of the image pickup device shown in FIG. 9.

FIG. 16 is a flowchart showing a guide display process performed by the long pressing operation. This process is also performed mainly by the CPU 6 and the operation determination unit 9. In particular, the CPU 6 and the operation determination unit 9 may perform the process together. Accordingly, the subject will be omitted. In FIG. 16, it is determined first whether or not a long pressing operation has been performed from the output of the touch panel 4 (step S40). When it is determined that a long pressing operation has not been performed (that is, when "NO" is determined in step S40), this process ends without performing any processing. On the other hand, when it is determined that a long pressing operation has been performed (that is, when "YES" is determined in step S40), the set function is read from the storage unit 8 (step S41), and the set flick operation is guide-displayed (step S42). After the guide display, this process ends. However, as described above, when a predetermined time has passed from the guide display, the guide display ends.

Thus, according to the image pickup device 70 according to the third embodiment, when a flick operation is performed on the touch panel 4, the imaging conditions in the camera unit 2 are changed from the first imaging conditions to the second imaging conditions that are different from the first imaging conditions. Therefore, the imaging conditions in the camera unit 2 can be quickly changed by the flick operation. As a result, the operability is improved. For example, a chance of missing the imaging opportunity is significantly reduced.

In addition, since at least either the synthesizing processing or the animation processing is performed on a captured image, changes in the imaging conditions can be recognized intuitively. Accordingly, the operability is improved. In addition, an amusement effect is also obtained by performing the animation processing.

In addition, since the setting of the flashlight unit 7 is changed when a flick operation is performed on the touch panel 4, the setting of the flashlight unit 7 can be changed immediately by the flick operation without having to open the menu or the operation of hard keys. As a result, the operability is improved. For example, a chance of missing the imaging opportunity is significantly reduced.

In addition, since a flick operation on the touch panel 4 and the function to be executed are stored in association with each other in the storage unit 8, the function to be executed by the flick operation can be customized freely. Accordingly, the operability is improved.

In addition, since a flick operation on the touch panel 4 and the function to be executed are listed on the display unit 3 when the touch panel 4 is pressed long, it is possible to easily check the setting state of the function. Accordingly, the operability is improved.

Moreover, in addition to the case of detection of long pressing, for example, a case where a plurality of fingers are detected simultaneously, a case where a predetermined guide icon is touched, or a case where the trajectory of predetermined contact is detected is also included.

In addition, in the third embodiment, not only the detection of the flick operation but also a case of detection of the sliding operation or a case of detection of the drag operation is included.

In addition, also in the image pickup device 70 according to the third embodiment, a program describing each process (the page turning process, the flashlight change process, the setting change process, and the guide display process) described above may be distributed in a state being stored in storage media, such as a magnetic disk, an optical disc, a magneto-optical disc, and a semiconductor memory, or may be stored in a server (not shown) on the network, such as the Internet, and be downloaded using the electrical communication line.

Fourth Embodiment

Figure 17:
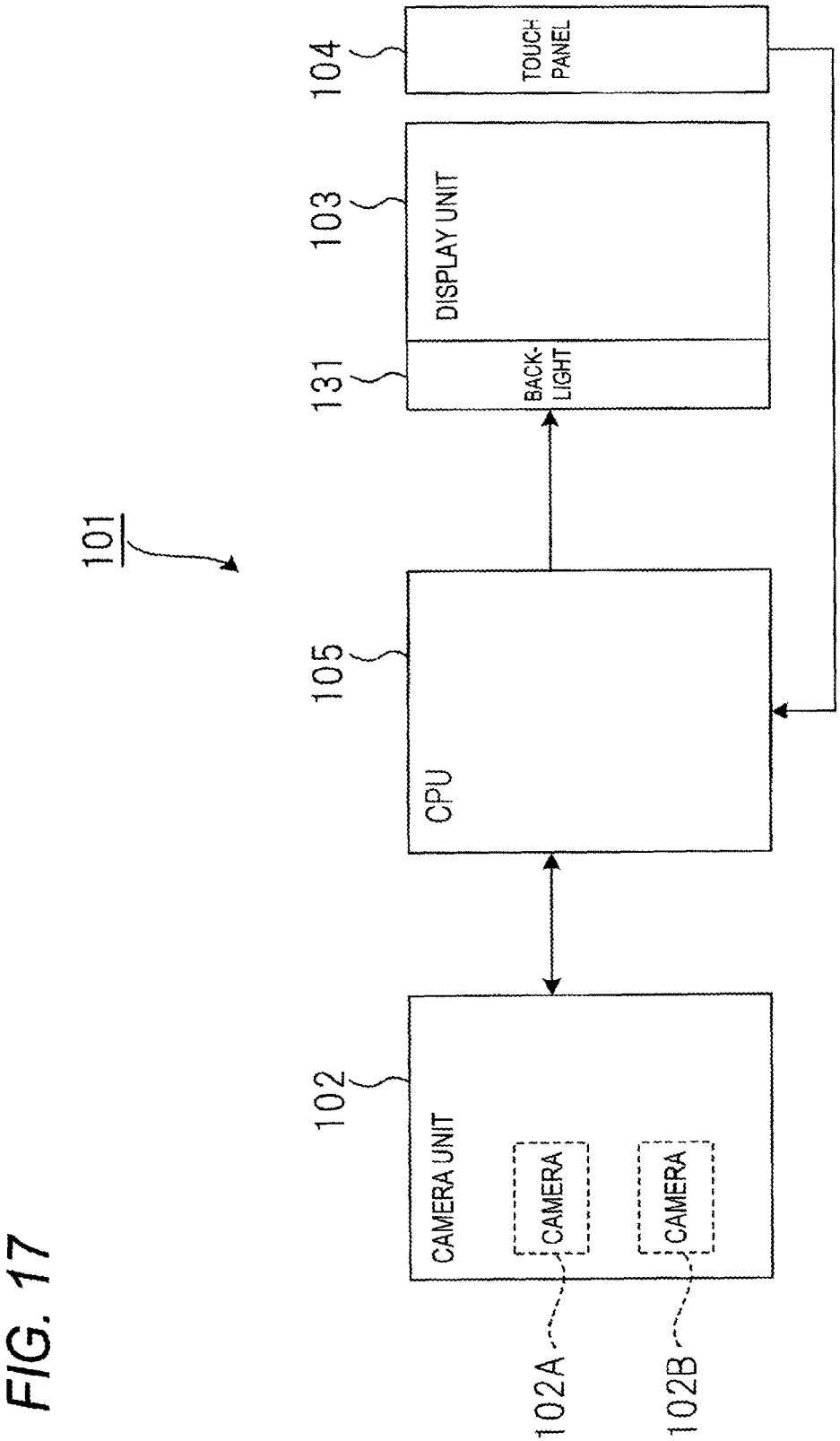
FIG. 17 is a block diagram showing the schematic configuration of an image pickup device according to a fourth embodiment of the present invention.
Figure 18A:
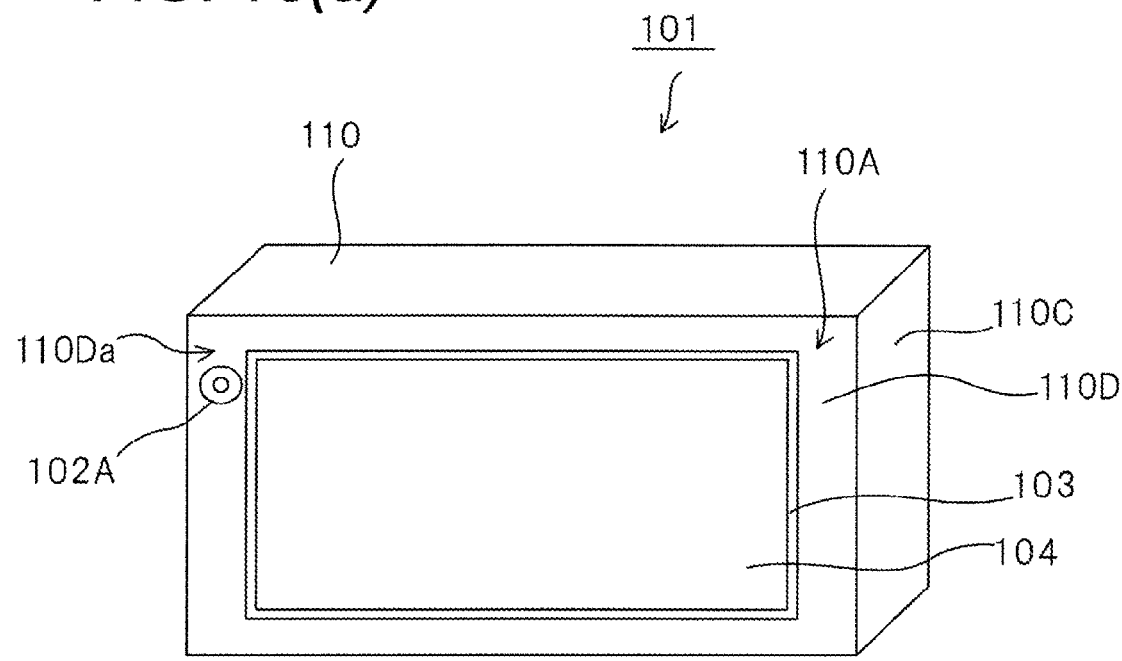
FIGS. 18(a) and 18(b) are perspective views showing an overview of the image pickup device shown in FIG. 17.
Figure 18B:
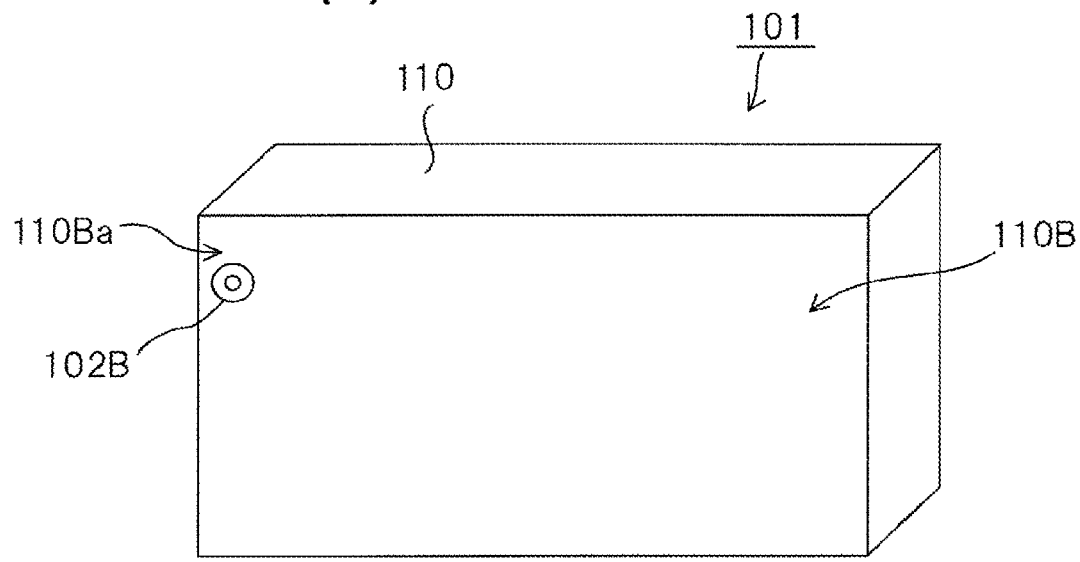

FIG. 17 is a block diagram showing the schematic configuration of an image pickup device according to a fourth embodiment of the present invention. FIGS. 18(a) and 18(b) are perspective views showing an overview of the image pickup device according to the present embodiment. As shown in FIG. 17, an image pickup device 101 according to the present embodiment includes a camera unit 102 having two cameras 102A and 102B, a display unit 103 that displays an image captured by the camera unit 102, a touch panel 104 for performing various operations to operate the image pickup device 101, and a central processing unit (CPU) 105 that controls each unit of the apparatus.

In addition, as shown in FIGS. 18(a) and 18(b), the image pickup device 101 according to the present embodiment has a housing 110 having a horizontally long rectangular shape with a first surface 110A and a second surface 110B. The display unit 103 and the touch panel 104 are disposed on the first surface 110A, and an edge portion 110D is provided between the display unit 103 and a corner 110C between the first and second surfaces 110A and 110B. In addition, as shown in FIG. 18(a), the camera 102A of the camera unit 102 is disposed in an upper left portion 110Da of the edge portion 110D on the first surface 110A side. In addition, as shown in FIG. 18(b), the camera 102B of the camera unit 102 is disposed in an upper left portion 110Ba of the second surface 110B of the housing 110. The edge portion 110D on the first surface 110A side becomes narrow with increase in the size of the display unit 103. Each of the display unit 103 and the touch panel 104 is formed in a rectangular shape. The width of the edge portion 110D is a value greater than 0 mm and less than 3.5 mm, for example. Alternatively, the width of the edge portion 110D may be any of the following (1) to (9) including this example.
(1) Value greater than 0 mm and less than 4.2 mm
(2) Value greater than 0 mm and less than 3.5 mm
(3) Value greater than 0 mm and less than 3.0 mm
(4) Value greater than 0 mm and less than 2.5 mm
(5) Value greater than 0 mm and less than 2.0 mm
(6) Value greater than 0 mm and less than 1.5 mm
(7) Value greater than 0 mm and less than 1.0 mm
(8) Value greater than 0 mm and less than 0.5 mm
(9) 0 mm (that is, when this image pickup device does not have an edge portion)

The camera unit 102 outputs an image signal of an object captured by the camera 102A or the camera 102B. The camera unit 102 performs control required for imaging, such as auto focus (AF), auto exposure (AE), auto white balance (AWB), electronic zoom, and imaging (shutter), at the time of imaging. Each of the cameras 102A and 102B has an imaging element (not shown), such as a charge coupled device (CCD) or a complementary metal oxide semiconductor (CMOS), and generates and outputs an image signal of an object formed on the imaging element.

The display unit 103 is a liquid crystal display device (LCD) including a backlight 131, and displays an image captured by the camera unit 102 or icons for executing various functions of the image pickup device 101. On the display unit 103, a video image is displayed before capturing an object (that is, before a shutter operation), and a still image is temporarily displayed and then a video image is displayed after the object is captured. In addition, a video image is displayed when reproducing the captured video image, and a still image is displayed when reproducing the captured still image. In addition, although not shown, the image pickup device 101 has a memory such as a flash memory for storing captured video images or still images.

The touch panel 104 is disposed so as to overlap the display surface of the display unit 103 on the opposite side to the backlight 131. The touch panel 104 outputs the information of the position where the finger or the like of a person has touched. The touch panel 104 has an unresponsive region with a predetermined width in a peripheral portion of the display unit 103 in a first mode, in which the display unit 103 displays an image captured by the camera unit 102, and does not have an unresponsive region in a second mode in which a predetermined image (for example, an image when viewing the homepage or an image when inputting the e-mail) is displayed. In the present embodiment, the size (area) of the touch panel 104 is set to be 90% or more and 100% or less of the area of the display unit 103. In addition, the size of the display unit 103 may be made smaller than that of the touch panel 104. For example, the size of the display unit 103 may be set to 90% or more and 100% or less of the area of the touch panel 104. In addition, the touch panel 104 may be of a pressure sensitive type or an electrostatic capacitance type, or may be of other types.

The CPU 105 has a read only memory (ROM) and a random access memory (RAM), and a program for controlling the CPU 105 is stored in the ROM. Accordingly, the RAM is used in the operation of the CPU 105 (so-called work memory). The CPU 105 has a plurality of modes for controlling each unit of the apparatus. Among the plurality of modes, in the first mode, an image captured by the camera unit 102 is displayed on the display unit 103. In this case, the display area of the image captured by the camera unit 102 is equal to or greater than 80% of the total area of the display unit 103. Accordingly, the image captured by the camera unit 102 is displayed on the substantially entire surface of the display unit 103. In the second mode, a different image (predetermined image) from the image displayed in the first mode is displayed on the display unit 103. In addition, in the first mode, the CPU 105 makes the touch panel 104 set an unresponsive region with a predetermined width in a peripheral portion of the display unit 103. In the second mode, the unresponsive region is not set.

Figure 19:
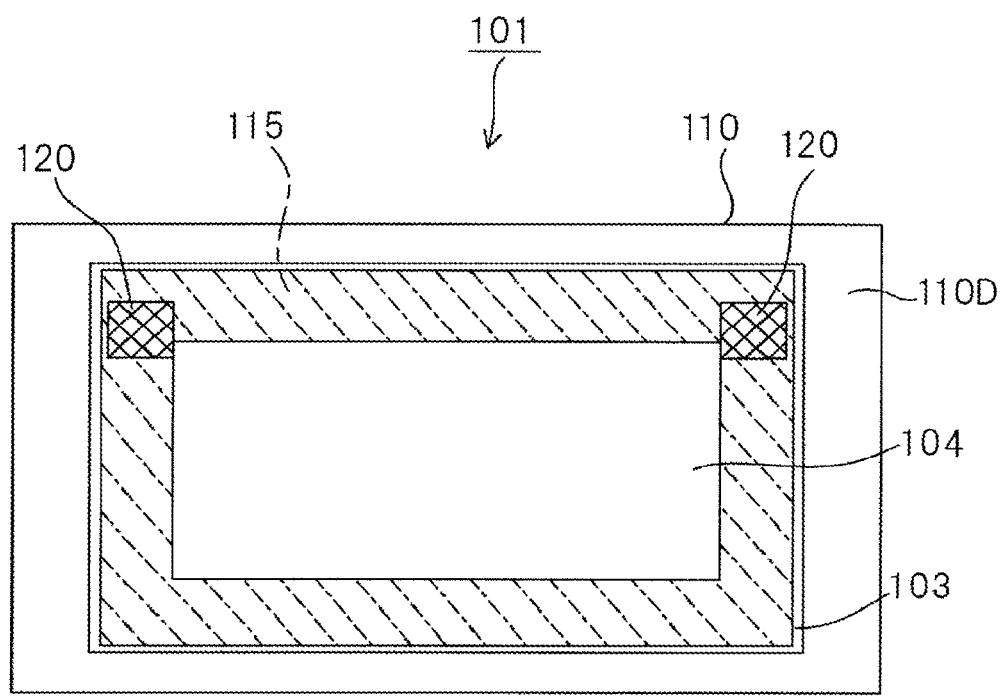
FIG. 19 is a diagram showing an unresponsive region set in a first mode of the image pickup device shown in FIG. 17.
Figure 20:
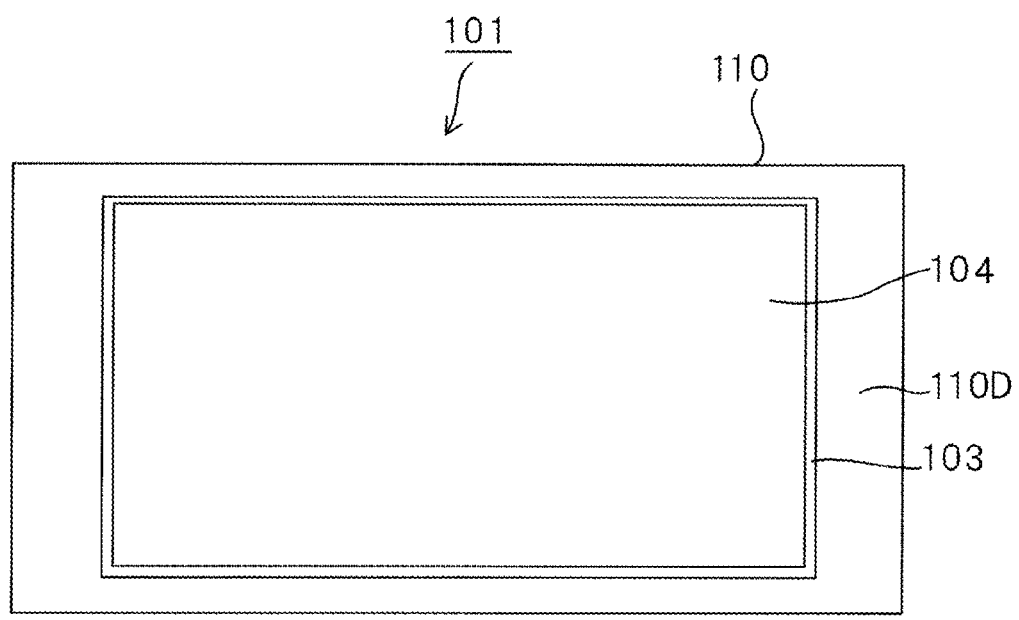
FIG. 20 is a diagram showing a display state in a second mode of the image pickup device shown in FIG. 17.

FIG. 19 is a diagram showing an unresponsive region set in the first mode of the image pickup device 101. As shown in this diagram, in the touch panel 104, an unresponsive region 115 is set in a peripheral portion of the display unit 103 in the first mode. The unresponsive region 115 is a belt-shaped region of a predetermined distance toward the center of the display unit 103 from the boundary of the edge portion 110D and the display unit 103, and is disposed along the four sides of the rectangular display unit 103. In this case, all unresponsive regions corresponding to the respective sides of the rectangular display unit 103 have the same width. FIG. 20 is a diagram showing a display state in the second mode of the image pickup device 101. As shown in this diagram, the unresponsive region 115 is not set in the second mode.

Figure 21:
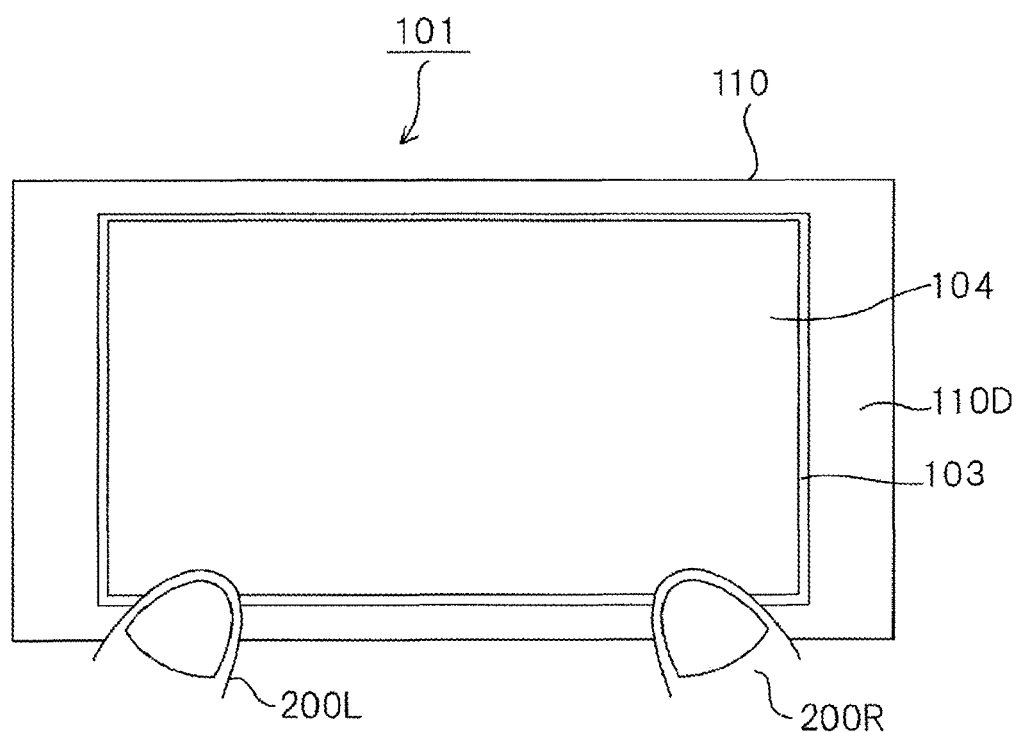
FIG. 21 is a diagram showing a state where the left and right thumbs are touching a display unit of the image pickup device shown in FIG. 17.

Since the unresponsive region 115 is set in a peripheral portion of the display unit 103 in the first mode, even if the finger of the user touches the end of the housing 110 at the time of imaging of the camera, processing corresponding to the touched position is not executed if the touch point is within the unresponsive region 115. Usually, both the short sides of the housing 110 are held by both hands at the time of imaging of the camera. In this case, as shown in FIG. 21, left and right thumbs 200L and 200R may touch the touch panel 104 (although it cannot be said that the thumbs necessarily touch the touch panel 104, it can be said that the percentage of thumb touches is high). In the case of an image pickup device that adopts a mechanism of performing auto focus, auto exposure, auto white balance, electronic zoom, and imaging (shutter) of a camera by touching a touch panel, a possibility of imaging or the like due to touching the touch panel with either of the left and right thumbs at the time of imaging of the camera is high. In the image pickup device 101 of the present embodiment, however, since the unresponsive region 115 is set in a peripheral portion of the display unit 103 in the first mode, imaging or the like is not performed even if the unresponsive region 115 is touched. That is, it is possible to prevent a malfunction caused by touching the end of the housing at the time of imaging of the camera.

On the other hand, an icon 120 (refer to FIG. 19) is effective even if the icon 120 is in the unresponsive region 115, and a touch to the icon 120 is accepted. That is, the CPU 105 receives a touch to the icon 120 present in the unresponsive region 115. Since the icon 120 is effective even if the icon 120 is included in the unresponsive region 115, it does not matter even if a part of the icon 120 protrudes from the unresponsive region 115 regardless of the size of the unresponsive region 115.

When it is detected that a region of the touch panel 104 other than the unresponsive region 115 has been touched, the CPU 105 receives an input of each function of the following (1) to (5). In this case, an input of combined functions of (1) to (5) or some of the functions is received.
(1) Selection of an object of auto focus
(2) Shutter (instruction to start imaging at least one still image when capturing a still image, and instruction to start imaging a video image when capturing a video image)
(3) Selection of an object of electronic zoom
(4) Selection of an object to adjust the exposure
(5) Selection of an object to adjust the white balance Next, the operation of the image pickup device 101 according to the present embodiment will be described.

Figure 22:
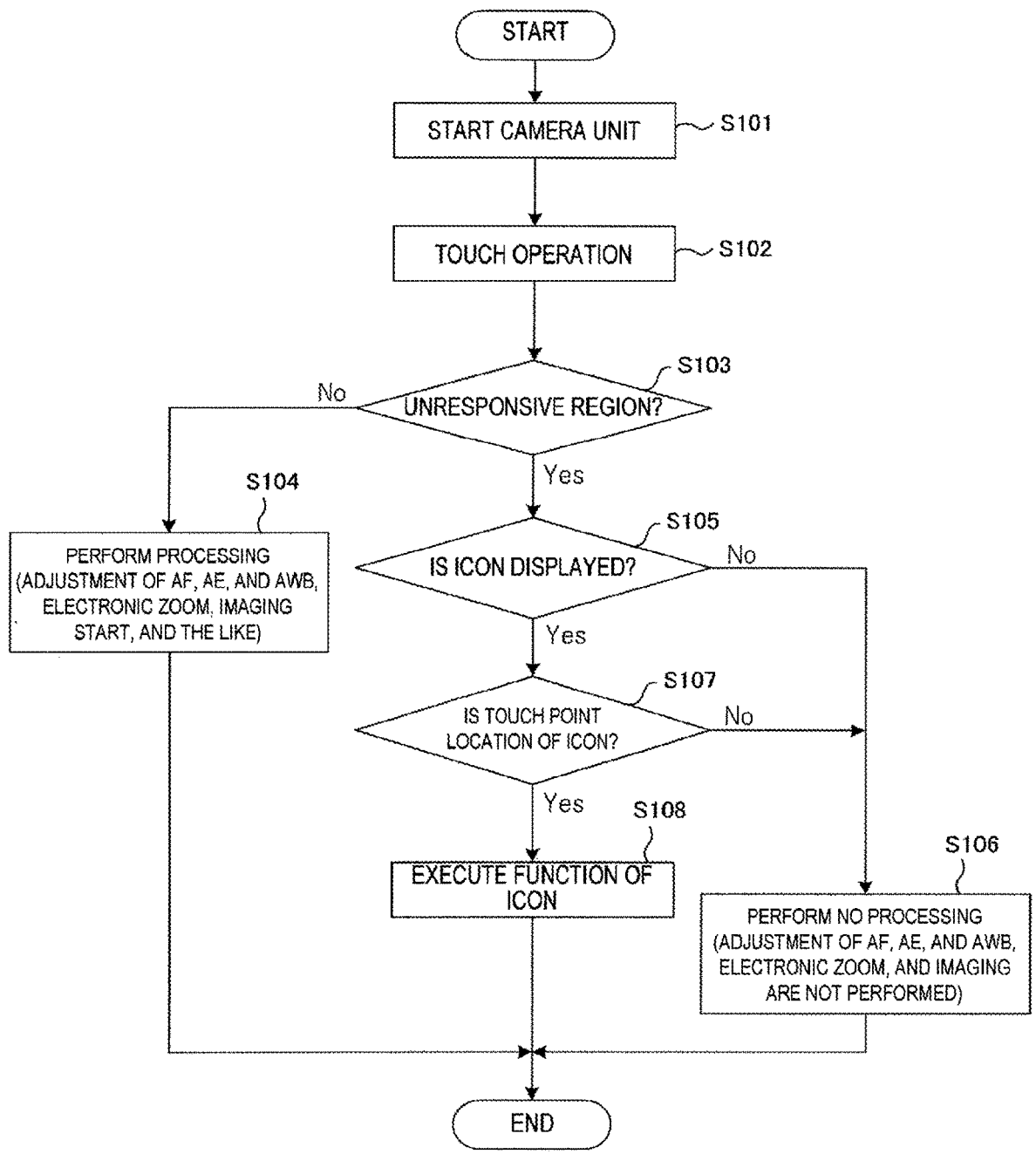
FIG. 22 is a flowchart for explaining the operation of the image pickup device shown in FIG. 17.

FIG. 22 is a flowchart for explaining the operation of the image pickup device 101 according to the present embodiment. In this diagram, the CPU 105 starts the camera unit 102 when detecting that a power switch (not shown) is turned on (step S101). After starting the camera unit 102, the CPU 105 receives a touch operation (step S102). Then, when a touch operation is received, it is determined whether or not the touched region is an unresponsive region (step S103). When a touch operation has been performed in a region other than the unresponsive region (that is, when "No" is determined in the determination of step S103), the CPU 105 performs processing corresponding to the operation (step S104). For example, auto focus (AF), auto exposure (AE), auto white balance (AWB), electronic zoom, imaging start, and the like are executed. After performing the processing, this process ends.

When a touch operation has been performed in the unresponsive region in the determination of step S103 described above (that is, when "Yes" is determined in the determination of step S103), the CPU 105 determines whether or not an icon is displayed (step S105). When no icon is displayed (when "No" is determined in the determination of step S105), no processing is performed (step S106). For example, auto focus (AF), auto exposure (AE), auto white balance (AWB), electronic zoom, and imaging start are not executed. After performing the processing, this process ends.

When an icon is displayed in the determination of step S105 described above (when "Yes" is determined in the determination of step S105), the CPU 105 determines whether or not the touch point is the location of the icon (step S107). When the touch point is not the location of the icon (when "No" is determined in the determination of step S107), the process of step S106 is performed, and this process ends. On the other hand, when the touch point is the location of the icon (when "Yes" is determined in the determination of step S107), the CPU 105 executes the function of the touched icon (step S108). After performing the processing, this process ends.

Thus, according to the image pickup device 101 according to the present embodiment, the display unit 103 has a first mode in which an image captured by the camera unit 102 is displayed and a second mode in which a predetermined image is displayed. In addition, in the first mode, the touch panel 104 has the unresponsive region 115 with a predetermined width in a peripheral portion of the display unit 103. Therefore, even if the frame of the housing 110 becomes narrow with increase in the size of the display unit 103, it is possible to prevent a malfunction caused by touching the end of the housing 110.

Figure 23:
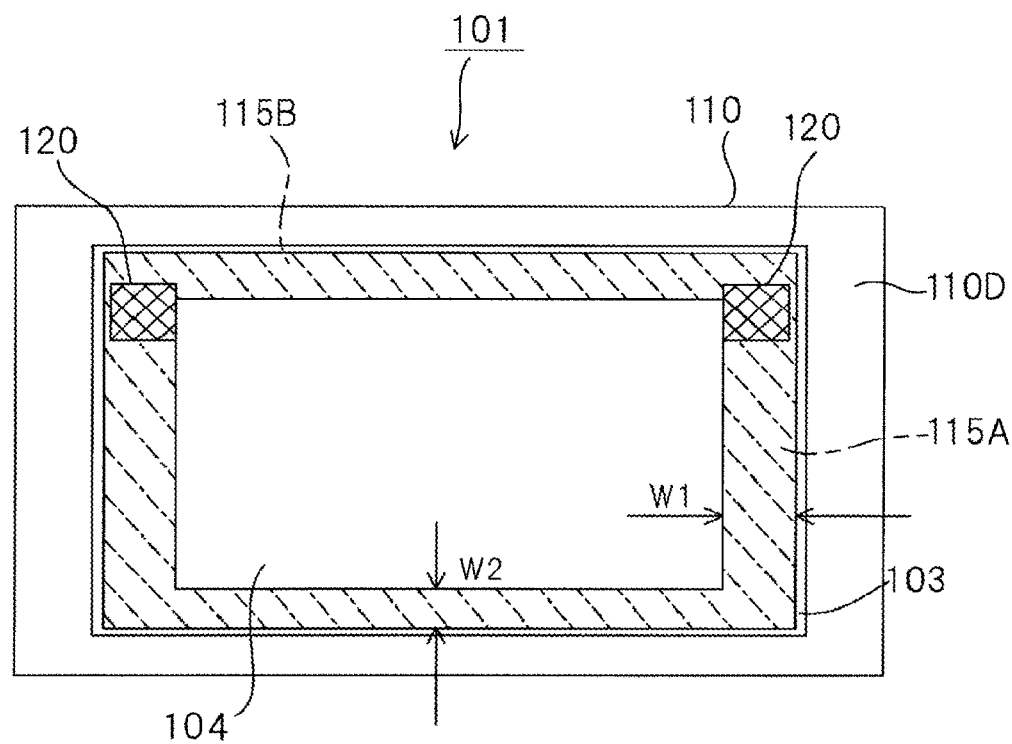
FIG. 23 is a diagram showing a modification of an unresponsive region of the image pickup device shown in FIG. 17.

In addition, although the unresponsive region 115 is disposed along the four sides of the rectangular display unit 103 in the present embodiment, the unresponsive region 115 may be disposed along at least one side of the display unit 103 without being limited to this pattern. For example, the unresponsive region 115 may be disposed along two opposing sides of the rectangular display unit 103. In addition, it is also possible to change the widths on the long and short sides of the rectangular display unit 103. For example, as shown in FIG. 23, the width W1 of an unresponsive region 115A on the short side of the rectangular display unit 103 may be larger than the width W2 of an unresponsive region 115B on the long side of the display unit 103.

Figure 24:
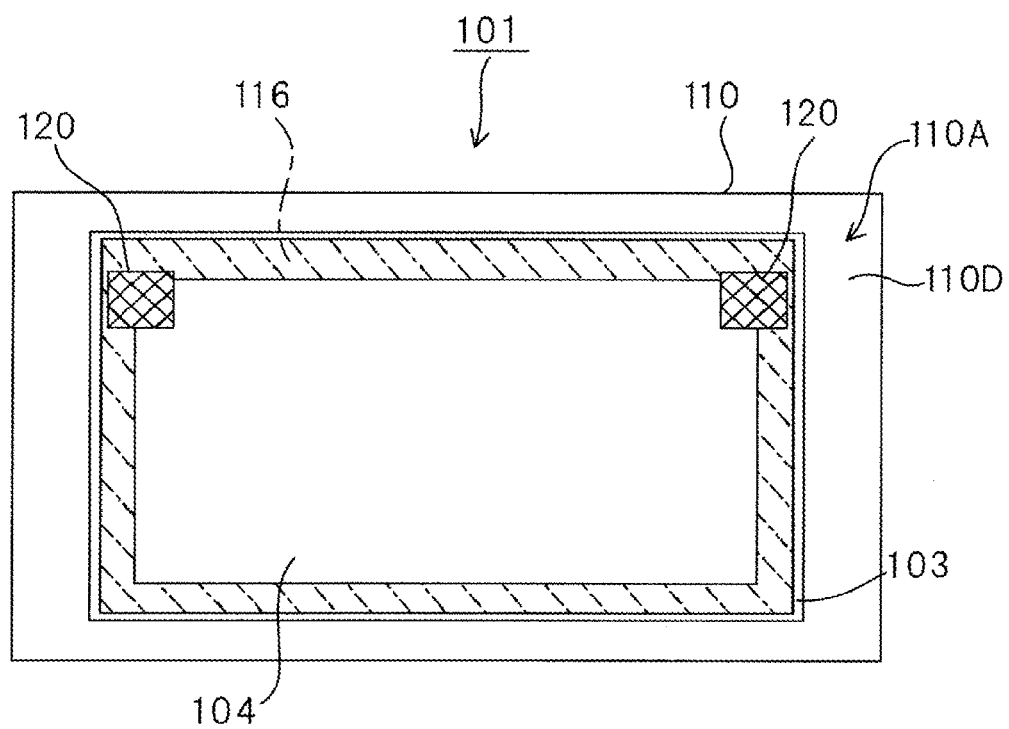
FIG. 24 is a diagram showing a modification of an unresponsive region of the image pickup device shown in FIG. 17.

In addition, the unresponsive region 115 may also be set in the second mode. In this case, the width of the unresponsive region may be set smaller than that in the first mode. FIG. 24 is a diagram showing the first surface 110A side of the housing 110 in the second mode. As shown in this diagram, in the second mode, an unresponsive region 116 having a narrower width than in the first mode is set in the touch panel 104.

In addition, although the touch panel 104 sets the unresponsive region 115 in the present embodiment, the CPU 105 may set the unresponsive region 115 for a touch operation. That is, the CPU 105 sets an unresponsive region with a predetermined width in a peripheral portion of the display unit 103 for a touch operation in the first mode, and sets no unresponsive region for a touch operation in the second mode.

In addition, in the present embodiment, the CPU 105 is made to have a program describing the process shown by the flowchart of FIG. 22. However, the program may be distributed in a state being stored in storage media, such as a magnetic disk, an optical disc, a magneto-optical disc, and a semiconductor memory, or may be stored in a server (not shown) on the network, such as the Internet, and be downloaded using the electrical communication line.

Fifth Embodiment

Figure 25:
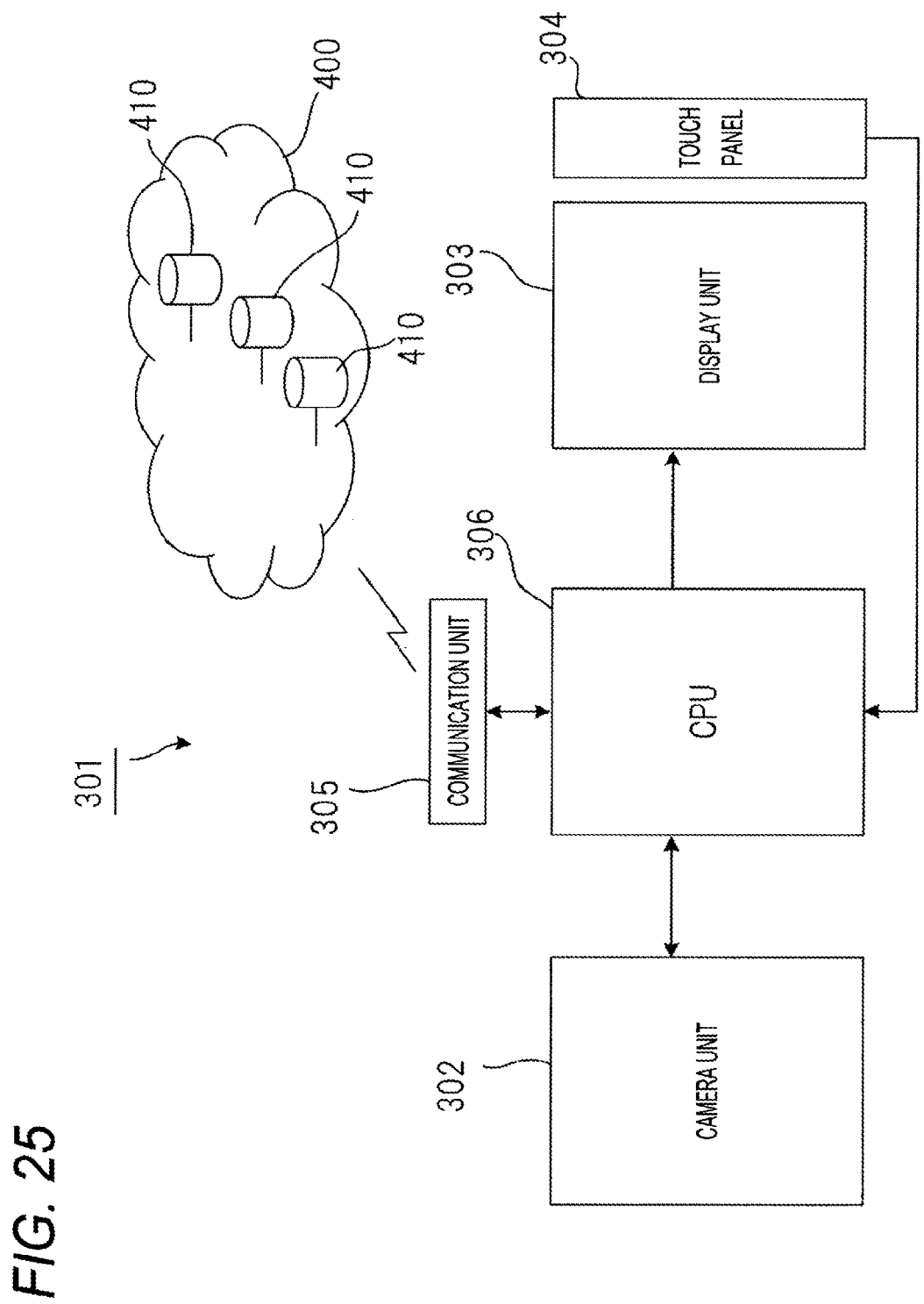
FIG. 25 is a block diagram showing the schematic configuration of an image pickup device according to a fifth embodiment of the present invention.

FIG. 25 is a block diagram showing the schematic configuration of an image pickup device according to a fifth embodiment of the present invention. In this diagram, an image pickup device 301 according to the present embodiment includes a camera unit 302, a display unit 303 that displays an image captured by the camera unit 302, a touch panel 304 for performing various operations to operate the image pickup device 301, a communication unit 305 that performs radio communication with a market site 410 on a network 400, such as the Internet, and a central processing unit (CPU) 306 that controls each unit of the apparatus.

The camera unit 302 has an imaging element (not shown), such as a charge coupled device (CCD) or a complementary metal oxide semiconductor (CMOS), and outputs an image signal of an object formed on the imaging element. In the camera unit 302, at the time of imaging, control required for the imaging, such as auto focus, auto exposure, auto white balance, electronic zoom, and imaging (shutter), is performed.

The display unit 303 is a rectangular liquid crystal display device including a backlight (not shown), and is used for a display for operating the image pickup device 301, display of an image captured by the image pickup device 301, and the like. The touch panel 304 has substantially the same rectangular shape as the display unit 303, and is disposed so as to overlap the display surface of the display unit 303 on the opposite side to the side on which a backlight (not shown) is provided. The touch panel 304 outputs the coordinate information of the position where the finger or the like of a person has touched. The coordinate information output from the touch panel 304 is input to the CPU 306. In the image pickup device 301, the size (that is, area) of the touch panel 304 is set to be 90% or more and 100% or less of the area of the display unit 303. In addition, the size of the display unit 303 may be made smaller than that of the touch panel 304. For example, the size of the display unit 303 may be set to 90% or more and 100% or less of the area of the touch panel 304. The communication unit 305 performs radio communication with the market site 410 on the network 400.

The CPU 306 has a read only memory (ROM), a random access memory (RAM), and the like that are not shown. A program for controlling the CPU 306 is stored in the ROM. The RAM is a so-called work memory used in the operation of the CPU 306. The CPU 306 displays a home screen on the display unit 303 immediately after the start of the image pickup device 301 (that is, immediately after turning on the power supply).

Figure 26:
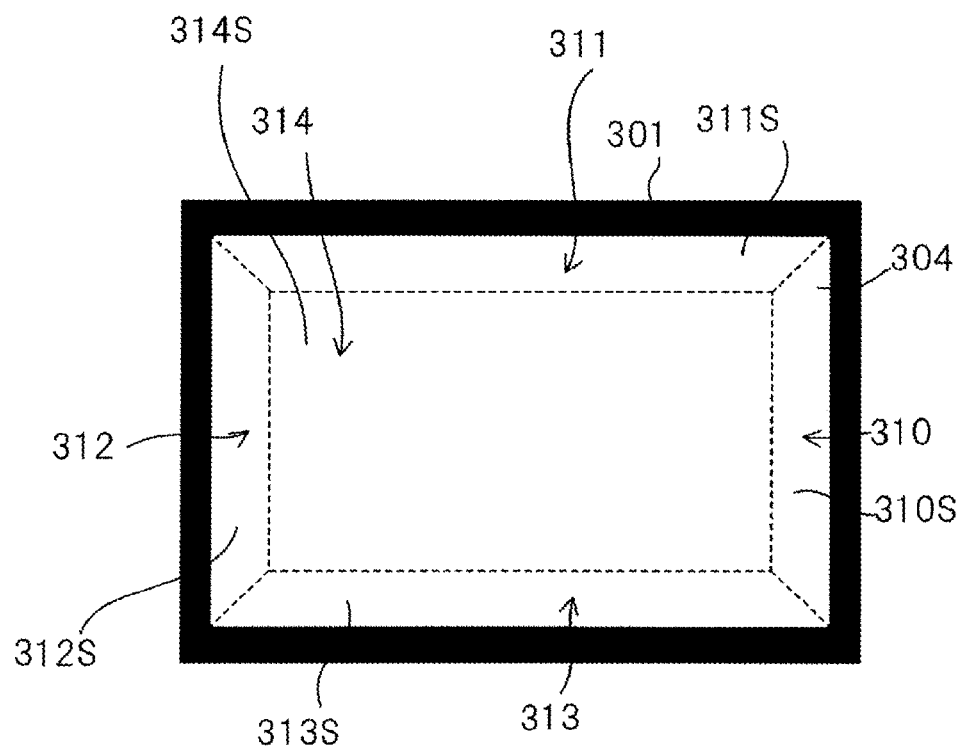
FIG. 26 is a diagram showing five sensitive regions set in a touch panel in a first mode of the image pickup device shown in FIG. 25.

FIG. 26 is a diagram showing five sensitive regions set in the touch panel 304 in the first mode. In this diagram, the five sensitive regions are four sensitive regions 310 to 313, which are set along the peripheral edge of the touch panel 304, and a sensitive region 314 surrounded by the four sensitive regions 310 to 313. Each of the four sensitive regions 310 to 313 forms a trapezoidal shape having a predetermined width, and the touch panel 304 is formed in a rectangular shape in particular. The two sensitive regions 311 and 313 on the long side of the touch panel 304 are longer than the two sensitive regions 310 and 312 on the short side.

The CPU 306 detects a touch of the finger of a person in each of the five sensitive regions 310 to 314 and executes an application (program), which is set corresponding to each of the five sensitive regions 310 to 314, according to the movement of the finger thereafter. Here, among the four sensitive regions 310 to 313 set in the peripheral edge of the touch panel 304, the sensitive region 310, the sensitive region 311, the sensitive region 312, and the sensitive region 313 are called "application (1) selection button 310S", "application (2) selection button 311S", "application (3) selection button 312S", and "application (4) selection button 313S", respectively. The application (1) selection button 310S to application (4) selection button 313S are buttons for starting downloaded applications (programs). In addition, the sensitive region 314 surrounded by the four sensitive regions 310 to 313 is called a "menu 314S" in a pre-installed application.

The CPU 306 operates in a plurality of modes. In particular, first and second modes operate as imaging modes, and a third mode operates as an application selection mode. When electric power is supplied to the image pickup device 301 and a user designates a pre-installed application operating as the first mode, the CPU 306 executes the first mode. When it is detected that the menu 314S in the pre-installed application of the touch panel 304 has been touched in the first mode, display corresponding to the first mode is performed. Display corresponding to the first mode is a graphic, an icon, or text. The pre-installed application is an application installed in the image pickup device 301 from the beginning, and is a "camera application", for example. The user can enjoy the application by activating the application.

In addition, when it is detected that one of the application (1) selection button 310S to application (4) selection button 313S of the touch panel 304 has been touched during the operation in the first mode, the CPU 306 performs display corresponding to the second mode. Display corresponding to the second mode is a graphic, an icon, or text. By performing the display, it is possible to reduce operation errors in the same manner as described above. Here, it is assumed that the application (1) selection button 310S has been touched. When the CPU 306 detects that the button has been touched exceeding a predetermined time (for example, 1 to 2 seconds) and further detects a flick operation (first flick operation) in a direction away from the button (first direction away from the long side of the sensitive region 310), switching from the first mode to the second mode occurs to start an application set for the application (1) selection button 310S.

By activating the application set for the application (1) selection button 310S, the user can enjoy the application. If the application is, for example, an "application of a camera", the user can enjoy a camera function that is different from the pre-installed camera application. However, when enjoying the downloaded application, it is necessary to download the application from the market site 410 on the network 400 in advance. In the image pickup device 301, four downloaded applications can be set for the four application (1) selection button 310S to application (4) selection button 313S.

Figure 27A:
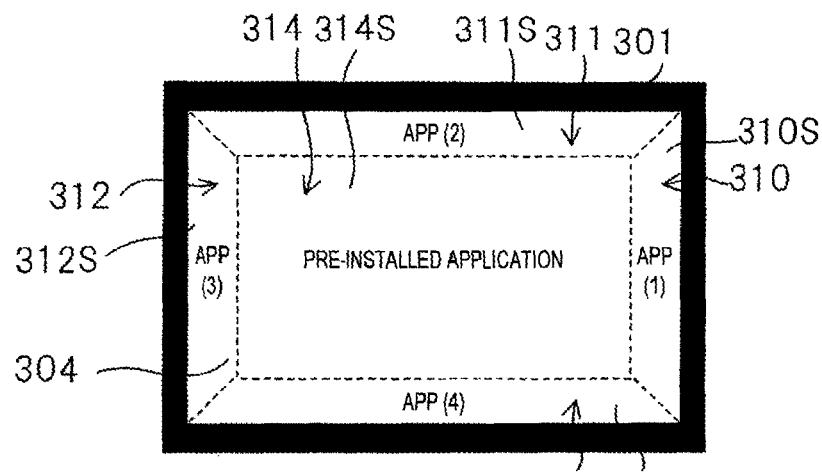
FIGS. 27(a) to 27(e) are diagrams showing the application start operation of the image pickup device shown in FIG. 25.
Figures 27B, 27C:
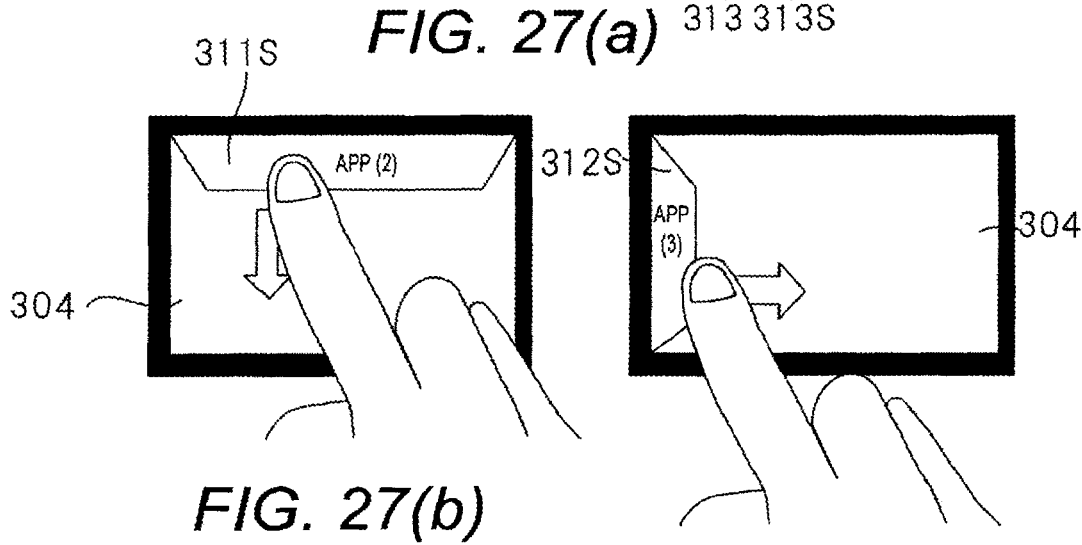
Figures 27D, 27E:
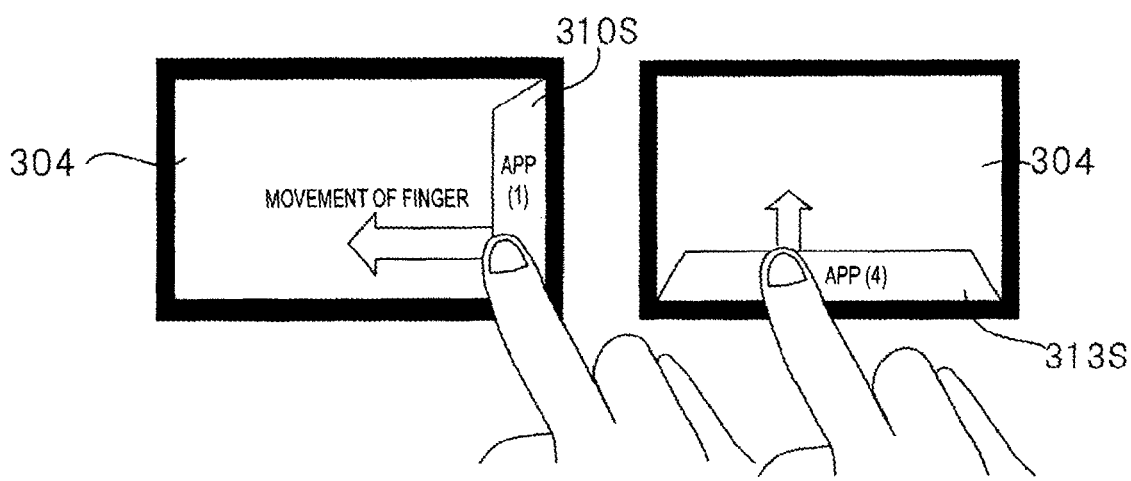

FIGS. 27(*a*) to 27(*e*) are diagrams showing the application start operation of the image pickup device 301. In this diagram, it is assumed that applications are set for all of the four application (1) selection button 310S to application (4) selection button 313S. As shown in FIG. 27(*b*), when starting the application set for the application (2) selection button 311S, the application (2) selection button 311S is touched exceeding a predetermined time (for example, 1 to 2 seconds) and then a flick operation is performed toward the center of the touch panel 304. As a result, the application set for the application (2) selection button 311S starts. In addition, as shown in FIG. 27(*c*), when starting the application set for the application (3) selection button 312S, the application (3) selection button 312S is touched exceeding a predetermined time (for example, 1 to 2 seconds) and then a flick operation is performed toward the center of the touch panel 304. As a result, the application set for the application (3) selection button 312S starts.

In addition, as shown in FIG. 27(*d*), when starting the application set for the application (1) selection button 310S, the application (1) selection button 310S is touched exceeding a predetermined time (for example, 1 to 2 seconds) and then a flick operation is performed toward the center of the touch panel 304. As a result, the application set for the application (1) selection button 310S starts. In addition, as shown in FIG. 27(*e*), when starting the application set for the application (4) selection button 313S, the application (4) selection button 313S is touched exceeding a predetermined time (for example, 1 to 2 seconds) and then a flick operation is performed toward the center of the touch panel 304. As a result, the application set for the application (4) selection button 313S starts.

Figure 28:
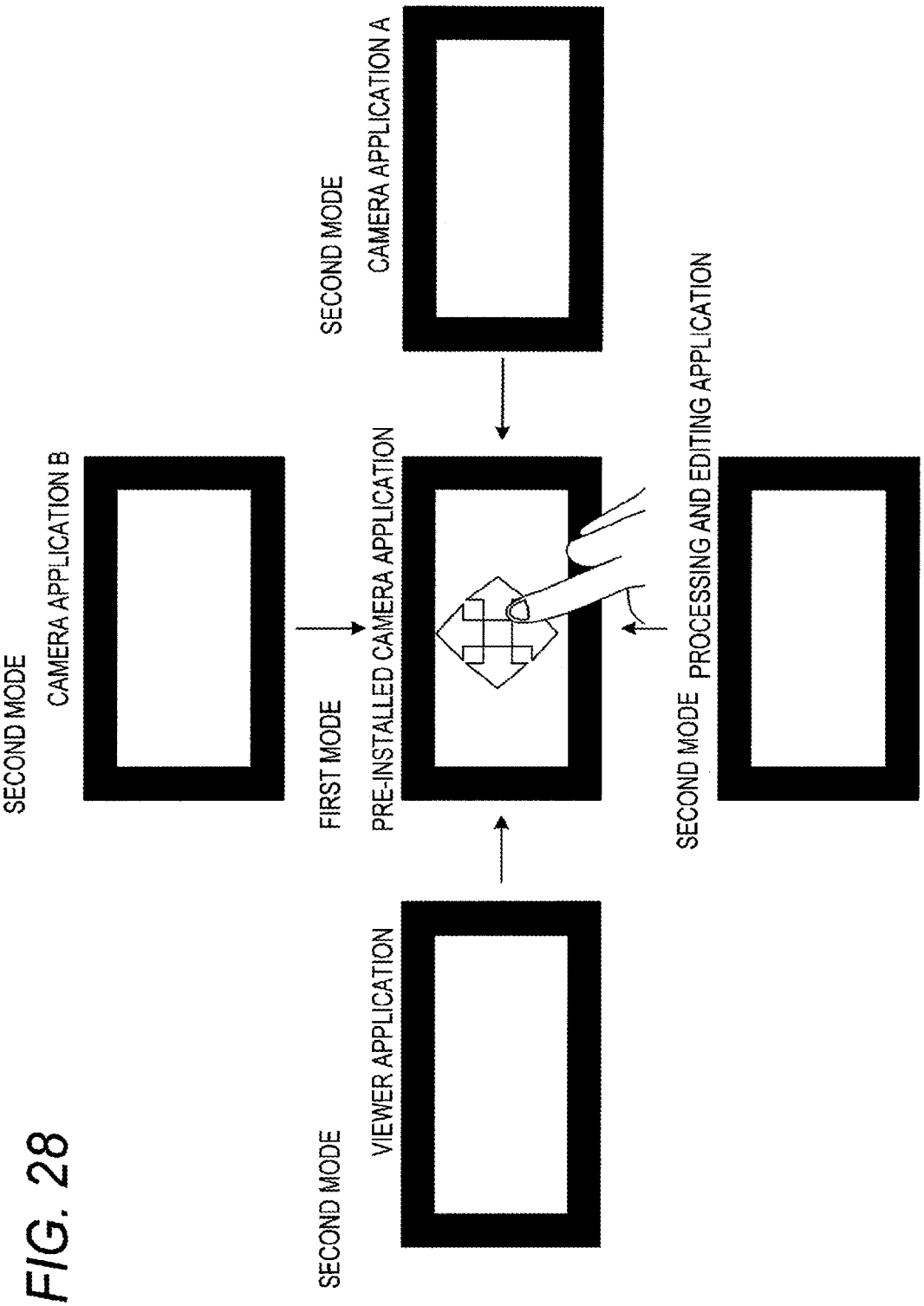
FIG. 28 is a diagram showing a specific example of the use of the image pickup device shown in FIG. 25.

FIG. 28 is a diagram showing a specific example of the use of the image pickup device 301. In this diagram, on the application operating as the first mode, a camera application A, a camera application B, a viewer application, and a processing and editing application are assumed to be set for the application (1) selection button 310S, the application (2) selection button 311S, the application (3) selection button 312S, and the application (4) selection button 313S, respectively. The pre-installed camera application is an application operating in the first mode, and the camera applications A and B, the viewer apparatus, and the processing and editing application are applications operating in the second mode. In addition, the viewer application is a mode in which an image captured in the first imaging mode is displayed. The processing and editing application is a mode in which an image captured in the first imaging mode is processed and edited.

Figure 29:
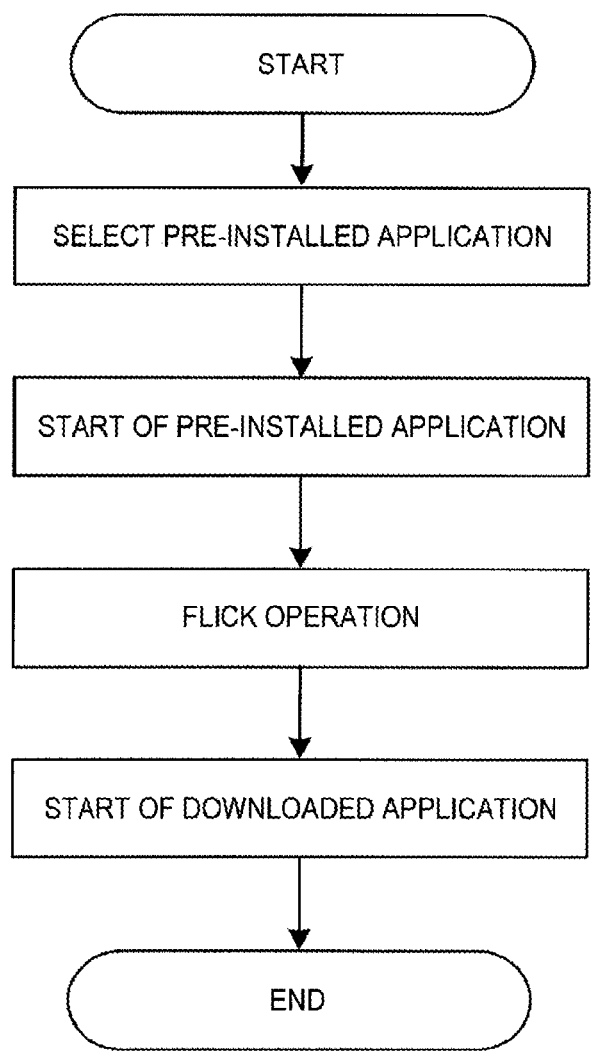
FIG. 29 is a flowchart showing the process of application switching of the image pickup device shown in FIG. 25.

Switching from the pre-installed application to the downloaded application is performed by the flick operation. For example, when a flick operation of selecting a downloaded application is detected in a state where a pre-installed application is selected and started, the downloaded application starts. This process is shown in the flowchart of FIG. 29. In addition, switching from the downloaded application to the pre-installed application is also possible by the flick operation (second flick operation). The direction (second direction) of the flick operation at the time of switching from the downloaded application to the pre-installed application is preferably an opposite direction to the direction of the flick operation at the time of switching from the pre-installed application to the downloaded application. In this case, the directions do not necessarily need to be exactly different by 180°, and the directions may be different by 170° to 190° or 160° to 200°.

Figure 30:
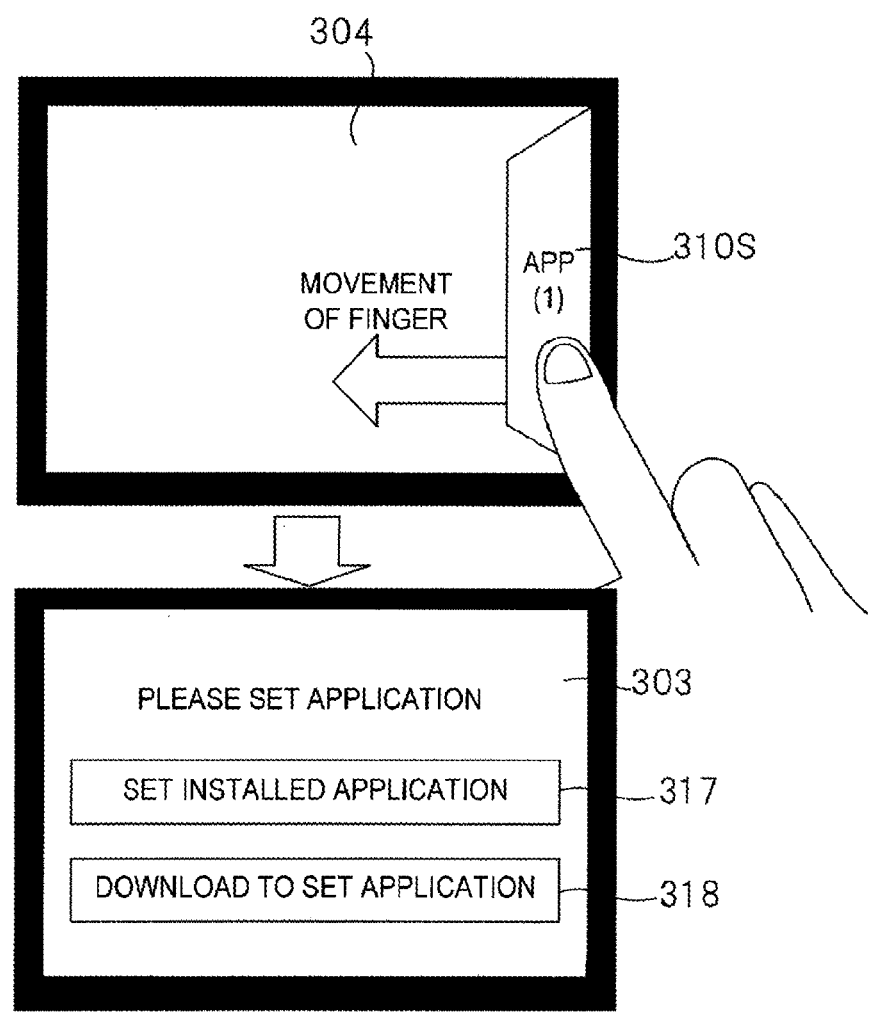
FIG. 30 is a diagram showing an example of a display prompting the setting of an application in the image pickup device shown in FIG. 25.

When the downloaded application is set, the CPU 306 performs switching from the first mode to the second mode according to the operation of the user. On the other hand, when the downloaded application is not set for the application (X) selection button (X=1, 2, 3, or 4) 310S, 311S, 312S, 313S selected by the user, the CPU 306 executes an application selection mode that is a third mode. When the application selection mode is executed, the CPU 306 performs display to prompt the setting of an application first. FIG. 30 is a diagram showing an example of a display prompting the setting of an application. In this diagram, for example, when an operation on the application (1) selection button 310S is performed in a state where no application is set for the application (1) selection button 310S, the CPU 306 displays a text message "Please set an application" on the display unit 303 and also displays a button 317 of the text message "Set installed" and a button 318 of the text message "Download to set an application" below the display. The user who sees this display touches the button 317 if the application has been downloaded, and touches the button 318 if the application has not been downloaded.

When it is detected that the button 317 has been touched, the CPU 306 sets the installed application in the application (1) selection button 310S. On the other hand, when it is detected that the button 318 has been touched, the CPU 306 makes a connection to the network 400 using the communication unit 305 and accesses the market site 410 having the application to download the application. Then, the downloaded application is set for the application (1) selection button 310S. Thus, when the user selects the application (X) selection button (X=1, 2, 3, or 4) 310S, 311S, 312S, or 313S for which no application is set, display to prompt the setting of the application is performed. Therefore, it is possible to ensure the setting of the application. That is, since the user sees this display, the user performs the setting of the application without forgetting it. As a result, it is possible to ensure the setting of the application.

Moreover, in addition to performing the display as a function of prompting the setting of the application, it is possible to ring a buzzer or to output a voice message. However, it is necessary to add a buzzer and a driving circuit of the buzzer in order to ring the buzzer, and it is necessary to add a speaker and a voice output circuit in order to output a voice message. If there are other functions of prompting the setting of the application, the functions may start.

Referring back to FIG. 25, when there is a user operation that accesses the market site 410 on the network 400, the CPU 306 accesses the market site 410 on the network 400 through the communication unit 305 and downloads an application that the market site 410 has. In this case, examples of the application downloaded from the market site 410 include the camera application A, the camera application B, the viewer application, and the processing and editing application described above. The CPU 306 stores (that is, installs) the downloaded application in a storage medium, such as a flash memory. The CPU 306 uses, for example, transmission control protocol/Internet protocol (TCP/IP) and hyper text transfer protocol (HTTP) as protocols required for the exchange of data using the network 400. The CPU 306 establishes a communication path using the TCP/IP, and transmits and receives data using the HTTP.

Next, the operation of the image pickup device 301 according to the present embodiment will be described.

Figure 31:
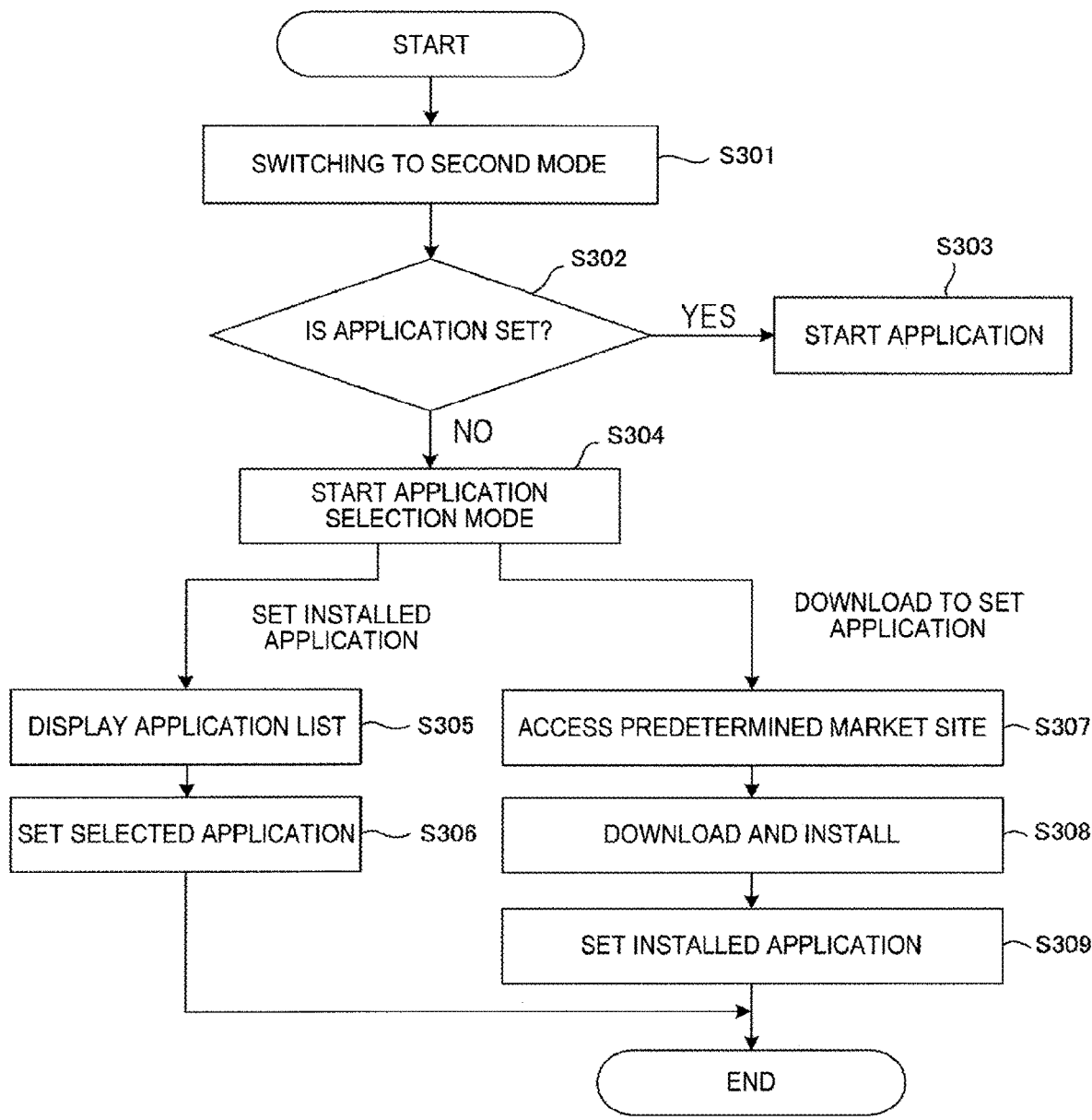
FIG. 31 is a flowchart for explaining the application selection process of the image pickup device shown in FIG. 25.
Figure 32:
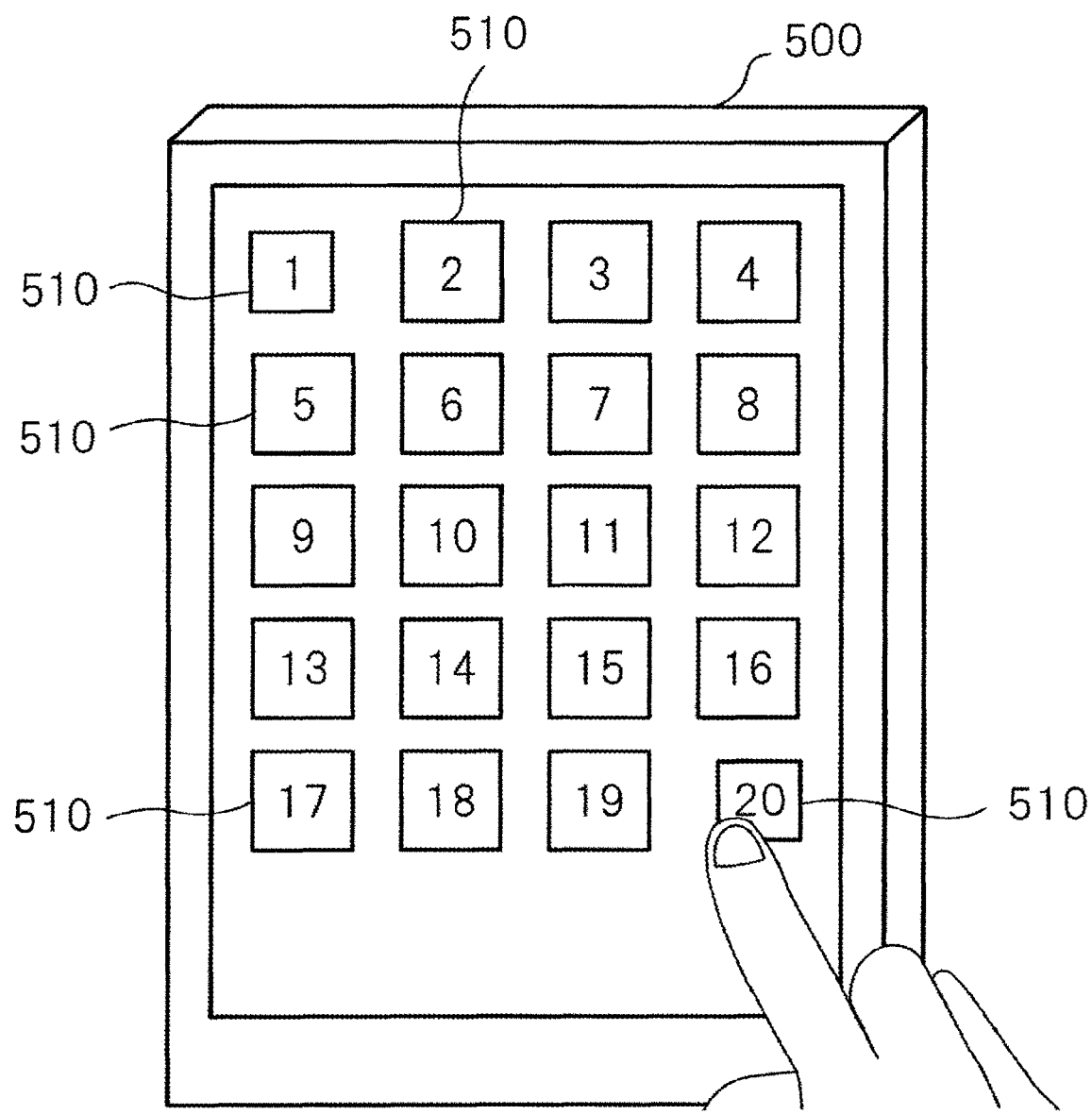
FIG. 32 is an overview diagram showing an example of a mobile terminal that has a communication function and can download an application through a network, such as the Internet.
Figure 33:
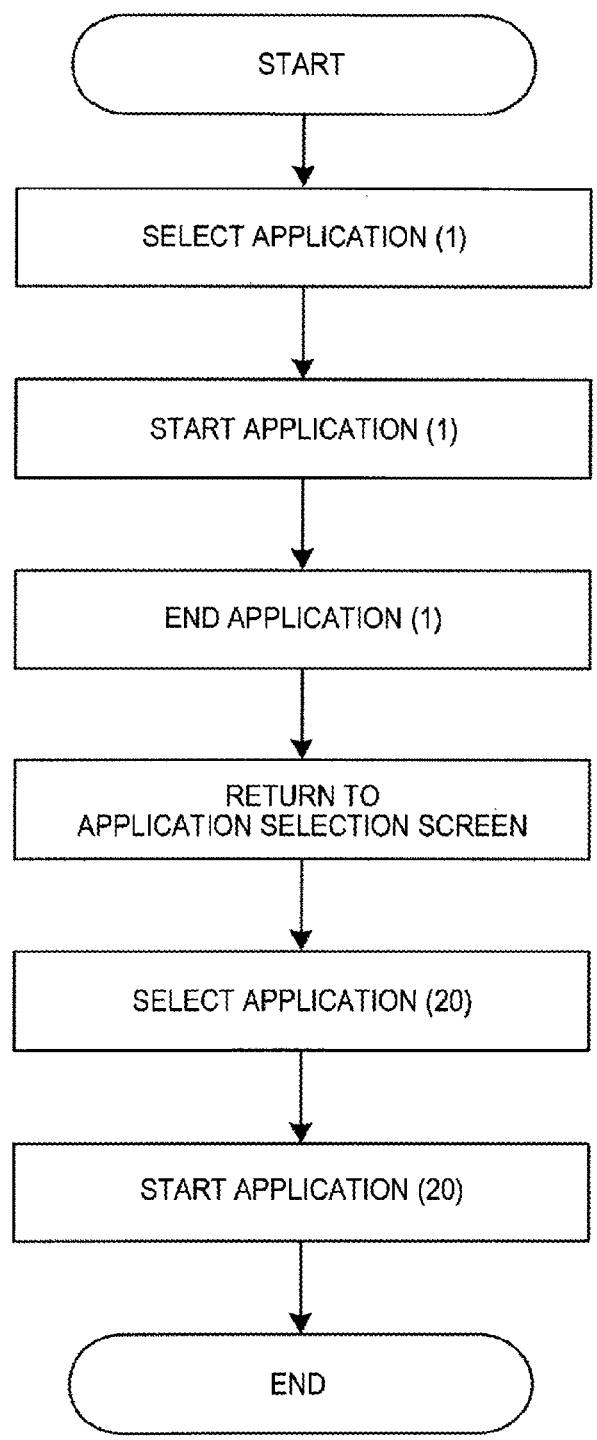
FIG. 33 is a flowchart showing the application start procedure of the mobile terminal shown in FIG. 32.

FIG. 31 is a flowchart for explaining the application selection process of the image pickup device 301 according to the present embodiment. In this diagram, when an operation for switching from the first mode to the second mode is performed, for example, when the application (1) selection button 310S is touched exceeding a predetermined time and a flick operation is performed toward the center of the touch panel 304 as shown in FIG. 30, the CPU 306 performs switching from the first mode to the second mode (step S301). Then, it is determined whether or not an application is set for the application (1) selection button 310S selected by the user (step S302). When it is determined that an application is set for the application (1) selection button 310S (that is, when "Yes" is determined in step S302), the application (1) starts (step S303).

On the other hand, when it is determined that no application is set for the application (1) selection button 310S (that is, when "No" is determined in step S302), the application selection mode is executed (step S304). That is, the CPU 306 displays a text message "Please set an application" on the display unit 303 and also displays the button 317 of the text message "Set installed" and the button 318 of the text message "Download to set an application" below the display. The user who sees this display touches the button 317 if the application has been downloaded, and touches the button 318 if the application has not been downloaded.

When the user touches the button 317 of the text message "Set installed", the CPU 306 displays a list of stored applications on the display unit 303 (step S305). Then, when the user designates a desired application while viewing the application list, the application stored in a storage medium, such as a flash memory, is read and set for the application (1) selection button 310S (step S306). After finishing the processing, this process ends.

On the other hand, when the user touches the button 318 of the text message "Download to set an application", the CPU 306 accesses the market site 410 using the communication unit 305 (step S307), and downloads and installs the application (step S308). Then, the installed application is set for the application (1) selection button 310S (step S309). After finishing the processing, this process ends.

Thus, the image pickup device 301 according to the present embodiment includes the camera unit 302, the display unit 303 that displays an image captured by the camera unit 302, the touch panel 304 disposed so as to overlap the display unit 303, and the CPU 306 that controls each unit of the apparatus, and the CPU 306 operates in at least the first and second modes. Switching from the first mode to the second mode occurs in response to detecting the first flick operation in the first direction by the user operation, and the application selected by the user starts in the second mode. Therefore, since application switching can be performed with a simple operation called a flick operation, it is possible to improve the convenience.

In addition, according to the image pickup device 301 according to the present embodiment, when an application that is installed but is not set so as to be bootable is selected by the user, the application is set so as to be bootable. In addition, an application that is not installed is downloaded from the market site 410 using the communication unit 305 and is set so as to be bootable. Therefore, it is possible to improve the operability.

In addition, in the present embodiment, the CPU 306 is made to have a program describing the process shown by the flowchart of FIG. 31. However, the program may be distributed in a state being stored in storage media, such as a magnetic disk, an optical disc, a magneto-optical disc, and a semiconductor memory, or may be stored in a server (not shown) on the network, such as the Internet, and be downloaded using the electrical communication line.

While the present invention has been described in detail with reference to the specific embodiments, it is apparent to those skilled in the art that various changes and modifications may be made without departing from the spirit and scope of the present invention.

This application is based on Japanese Patent Application (Patent Application No. 2011-223175) filed on Oct. 7, 2011, Japanese Patent Application (Patent Application No. 2011-228032) filed on Oct. 17, 2011, Japanese Patent Application (Patent Application No. 2011-273522) filed on Dec. 14, 2011, and Japanese Patent Application (Patent Application No. 2012-018813) filed on Jan. 31, 2012, the entire contents of which are incorporated herein by reference.

INDUSTRIAL APPLICABILITY

The present invention has an effect that the screen of the display unit can be checked easily and reliably even if imaging is done under bright environment, such as the outdoors under the clear sky, an effect that a malfunction caused by touching the end of the housing can be prevented even if the frame of the housing becomes narrow with increase in the size of the display unit, or an effect that application switched can be performed with a simple operation called a flick operation. Therefore, the present invention can be applied to mobile terminals, such as a mobile phone in which a camera is mounted.

DESCRIPTION OF REFERENCE SIGNS

1, 10, 20, 70: image pickup device
1A: first surface
1B: second surface
2: camera unit
3: display unit
4: touch panel
5: vertical sensor
6: CPU
7: flashlight unit
8: storage unit
9: operation determination unit
10: icon
11: synthesizing unit
21: communication unit
22: storage unit
31: backlight
40: Internet
50: server
60: display device
80: menu button
81: up/down button
82: LCD brightness button
83: left/right button
84: exposure change button
101: image pickup device
102: camera unit
102A, 102B: camera
103: display unit
104: touch panel
105: CPU
110: housing
110A: first surface
110B: second surface
110C: corner
110D: edge portion
115, 115A, 115B, 116: unresponsive region
120: icon
131: backlight
301: image pickup device
302: camera unit
303: display unit
304: touch panel
305: communication unit
306: CPU
310 to 314: unresponsive region
310S: application (1) selection button
311S: application (2) selection button
312S: application (3) selection button
313S: application (4) selection button
314S: menu
317, 318: button
400: network
410: market site

What is claimed is:

1. A displaying method of a display device including a display and a touch panel overlapped with the display and configured to detect at least a sliding touch operation performed on the touch panel, the display device configured to be coupled with a camera, the display device having at least a first mode, a second mode and a third mode, the display being configured to display a video image captured by the camera in each of the first mode, the second mode and the third mode, the displaying method comprising:
   switching to the second mode by a first sliding touch operation in a first direction on the touch panel, in the first mode;
   switching to the third mode by a second sliding touch operation in the first direction on the touch panel, in the second mode;
   switching to the second mode by a third sliding touch operation in a second direction on the touch panel, in the third mode, the second direction being substantially opposite to the first direction on the touch panel; and
   switching to the first mode by a fourth sliding touch operation in the second direction on the touch panel, in the second mode.

2. The displaying method for the display device according to claim 1, wherein
   the first mode is different from the second mode, and the second mode is different from the third mode.

3. The displaying method for the display device according to claim 1, wherein
   in one of the first mode, the second mode and the third mode, the display displays a processed video image, which is generated by applying, on the video image captured by the camera, a process corresponding to the one of the first mode, the second mode, and the third mode.

4. The displaying method for the display device according to claim 1, wherein
   in at least one of the first mode, the second mode or the third mode, the display displays a still image captured by the camera, in response to an operation.

5. The displaying method for the display device according to claim 1, wherein the first direction and the second direction are different by at least 160 degrees or more, and at least 200 degrees or less.

6. The displaying method for the display device according to claim 1, wherein
the first direction and the second direction are different by at least 170 degrees or more, and at least 190 degrees or less.

7. The displaying method for the display device according to claim 1, wherein
the display has a rectangular shape, and
at least one of the first direction or the second direction is a direction away from one side of the rectangular shape.

8. The displaying method for the display device according to claim 1, wherein
an area of the display overlapping the touch panel is 90% or more and 100% or less of an area of the display.

9. The displaying method for the display device according to claim 1, wherein
an area of the touch panel overlapping the display is 90% or more and 100% or less of an area of the touch panel.

10. A display device comprising:
a display; and
a touch panel overlapped with the display, and configured to detect at least a sliding touch operation performed on the touch panel, wherein
the display device is configured to be coupled with a camera,
the display device has at least a first mode, a second mode and a third mode,
the display is configured to display a video image captured by the camera in each of the first mode, the second mode and the third mode,
switching to the second mode occurs by a first sliding touch operation in a first direction on the touch panel, in the first mode,
switching to the third mode occurs by a second sliding touch operation in the first direction on the touch panel, in the second mode,
switching to the second mode occurs by a third sliding touch operation in a second direction on the touch panel, in the third mode, the second direction being substantially opposite to the first direction on the touch panel, and
switching to the first mode occurs by a fourth sliding touch operation in the second direction on the touch panel, in the second mode.

11. The display device according to claim 10, wherein
the first mode is different from the second mode, and the second mode is different from the third mode.

12. The display device according to claim 10, wherein
in one of the first mode, the second mode and the third mode, the display displays a processed video image, which is generated by applying, on the video image captured by the camera, a process corresponding to the one of the first mode, the second mode, and the third mode.

13. The display device according to claim 10, wherein
in at least one of the first mode, the second mode or the third mode, the display displays a still image captured by the camera, in response to an operation.

14. The display device according to claim 10, wherein
the first direction and the second direction are different by at least 160 degrees or more, and at least 200 degrees or less.

15. The display device according to claim 10, wherein
the first direction and the second direction are different by at least 170 degrees or more, and at least 190 degrees or less.

16. The display device according to claim 10, wherein
the display has a rectangular shape, and
at least one of the first direction or the second direction is a direction away from one side of the rectangular shape.

17. The display device according to claim 10, wherein
an area of the display overlapping the touch panel is 90% or more and 100% or less of an area of the display.

18. The display device according to claim 10, wherein
an area of the touch panel overlapping the display is 90% or more and 100% or less of an area of the touch panel.

19. A control method of an image pickup device including a camera, a display, and a touch panel overlapped with the display and configured to detect at least a sliding touch operation performed on the touch panel, the image pickup device having at least a first mode, a second mode, and a third mode, the display being configured to display a video image captured by the camera in each of the first mode, the second mode and the third mode, the control method comprising:
switching to the second mode by a first sliding touch operation in a first direction on the touch panel, in the first mode;
switching to the third mode by a second sliding touch operation in the first direction on the touch panel, in the second mode;
switching to the second mode by a third sliding touch operation in a second direction on the touch panel, in the third mode, the second direction being substantially opposite to the first direction on the touch panel; and
switching to the first mode by a fourth sliding touch operation in the second direction on the touch panel, in the second mode.

20. The control method for the image pickup device according to claim 19, wherein
the first mode is different from the second mode, and the second mode is different from the third mode.

* * * * *